US006868605B2

(12) United States Patent
Maeng et al.

(10) Patent No.: US 6,868,605 B2
(45) Date of Patent: Mar. 22, 2005

(54) METHOD OF MANUFACTURING A BUBBLE-JET TYPE INK-JET PRINTHEAD

(75) Inventors: Doo-jin Maeng, Seoul (KR); Keon Kuk, Yongin (KR); Yong-soo Oh, Seongnam (KR); Hyeon-cheol Kim, Seoul (KR); Sang-wook Lee, Seongnam (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 0 days.

(21) Appl. No.: 10/355,020

(22) Filed: Jan. 31, 2003

(65) Prior Publication Data

US 2003/0142169 A1 Jul. 31, 2003

Related U.S. Application Data

(62) Division of application No. 10/015,673, filed on Dec. 17, 2001, now Pat. No. 6,561,625.

(30) Foreign Application Priority Data

Dec. 15, 2000 (KR) ........................................ 2000-77167
Jan. 19, 2001 (KR) .......................................... 2001-3161

(51) Int. Cl.[7] ........................... B21D 53/76; B23P 17/00

(52) U.S. Cl. .......................... 29/890.1; 29/611; 29/617; 29/619; 29/621; 216/2; 347/47; 347/63; 347/65

(58) Field of Search ................................ 29/890.1, 611, 29/617, 619, 621, 613; 216/2; 347/47, 63, 65

(56) References Cited

U.S. PATENT DOCUMENTS

| | | | | |
|---|---|---|---|---|
| 4,339,762 A | | 7/1982 | Shirato et al. | |
| 4,847,630 A | | 7/1989 | Bhaskar et al. | |
| 4,882,595 A | | 11/1989 | Trueba et al. | |
| 4,914,562 A | | 4/1990 | Abe et al. | |
| 5,760,804 A | | 6/1998 | Heinzl et al. | |
| 5,841,452 A | * | 11/1998 | Silverbrook | 347/47 |
| 5,850,241 A | | 12/1998 | Silverbrook | |
| 6,019,457 A | | 2/2000 | Silverbrook | |
| 6,042,222 A | | 3/2000 | Moritz, III et al. | |
| 6,273,557 B1 | * | 8/2001 | Milligan et al. | 347/65 |
| 6,398,348 B1 | * | 6/2002 | Haluzak et al. | 347/63 |

FOREIGN PATENT DOCUMENTS

EP 0 317 171 A2 5/1989

OTHER PUBLICATIONS

Tseng, et al., "A Novel Microinjector with Virtual Chamber Neck", 11$^{th}$ IEEE Workshop on MEMS, Heidelberg, Germany (Jan. 25–29, 1998).

* cited by examiner

*Primary Examiner*—Carl J. Arbes
*Assistant Examiner*—Tim Phan
(74) *Attorney, Agent, or Firm*—Lee, Sterba & Morse, P.C.

(57) ABSTRACT

A bubble-jet type ink-jet printhead and manufacturing method thereof including a substrate integrally having an ink supply manifold, an ink chamber, and an ink channel; a nozzle plate having a nozzle on the substrate; a heater centered around the nozzle and an electrode for applying current to the heater on the nozzle plate; and an adiabatic layer on the heater for preventing heat generated by the heater from being conducted upward from the heater. Alternatively, a bubble-jet type ink-jet printhead may be formed on a silicon-on-insulator (SOI) wafer having a first substrate, an oxide layer, and a second substrate stacked thereon and include an adiabatic barrier on the second substrate. In the bubble-jet type ink-jet printhead and manufacturing method thereof, the adiabatic layer or the adiabatic barrier is provided to transmit most of the heat generated by the heater to ink under the heater, thereby increasing energy efficiency.

14 Claims, 25 Drawing Sheets

METHOD OF MANUFACTURING A BUBBLE-JET TYPE INK-JET PRINTHEAD

CROSS REFERENCES TO RELATED DOCUMENTS

This application is a Division of application Ser. No. 10/015,673, filed Dec. 17, 2001, now U.S. Pat. No. 6,561,625 B2, which claims the benefit of Korean Patent Applications Nos. 2000-77167, filed Dec. 15, 2000, and 2001-3161, filed Jan. 19, 2001.

BACKGROUND OF THE INVENTION

1. Field of the Invention

The present invention relates to an ink-jet printhead. More particularly, the present invention relates to a bubble-jet type ink-jet printhead having a hemispherical ink chamber and a manufacturing method thereof.

2. Description of the Related Art

Ink-jet printing heads are devices for printing a predetermined color image by ejecting small droplets of printing ink at desired positions on a recording sheet. Ink ejection mechanisms of an ink-jet printer are generally categorized into two types: an electro-thermal transducer type (bubble-jet type), in which a heat source is employed to form a bubble in ink causing an ink droplet to be ejected, and an electromechanical transducer type, in which a piezoelectric crystal bends to change the volume of ink causing an ink droplet to be expelled.

FIG. 1A is a cross-sectional, perspective view showing an example of the structure of a conventional bubble-jet type ink-jet printhead as disclosed in U.S. Pat. No. 4,882,595. FIG. 1B is a cross-sectional view illustrating a process of ejecting an ink droplet from the printhead of FIG. 1A. The conventional bubble-jet type ink-jet printhead shown in FIGS. 1A and 1B includes a substrate 10, a barrier wall 12 disposed on the substrate 10 for forming an ink chamber 13 filled with ink 19, a heater 14 disposed in the ink chamber 13, and a nozzle plate 11 having a nozzle 16 for ejecting an ink droplet 19'. The ink 19 is introduced into the ink chamber 13 through an ink feed channel 15, and the ink 19 fills the nozzle 16 connected to the ink chamber 13 by capillary action. In a printhead of the current configuration, if current is supplied to the heater 14, the heater 14 generates heat to form a bubble 18 in the ink 19 within the ink chamber 13. The bubble 18 expands to exert pressure on the ink 19 present in the ink chamber 13, which causes an ink droplet 19' to be expelled through the nozzle 16. Then, ink 19 is introduced through the ink feed channel 15 to refill the ink chamber 13.

There are multiple factors and parameters to consider in making an ink-jet printhead having a bubble-jet type ink ejector. First, it should be simple to manufacture, have a low manufacturing cost, and be capable of being mass-produced. Second, in order to produce high quality color images, the formation of minute, undesirable satellite ink droplets that usually trail an ejected main ink droplet must be avoided. Third, when ink is ejected from one nozzle or when ink refills an ink chamber after ink ejection, cross-talk with adjacent nozzles, from which no ink is ejected, must also be avoided. To this end, a backflow of ink in a direction opposite to the direction ink is ejected from a nozzle must be prevented during ink ejection. Fourth, for high speed printing, a cycle beginning with ink ejection and ending with ink refill in the ink channel must be carried out in as short a period of time as possible. That is, an operating frequency must be high. Fifth, the printhead needs to have a small thermal load imposed due to heat generated by a heater and the printhead should operate stably for long periods of time at high operating frequencies.

The above requirements, however, tend to conflict with one another. Furthermore, the performance of an ink-jet printhead is closely associated with and affected by the structure and design of an ink chamber, an ink channel, and a heater, as well as by the type of formation and expansion of bubbles, and the relative size of each component.

In an effort to overcome problems related to the above requirements, ink-jet printheads having a variety of structures have been proposed in U.S. Pat. Nos. 4,339,762; 5,760,804; 4,847,630; and 5,850,241 in addition to the above-referenced U.S. Pat. No. 4,882,595; European Patent No. 317,171; and Fan-Gang Tseng, Chang-Jin Kim, and Chih-Ming Ho, "A Novel Microinjector with Virtual Chamber Neck," IEEE MEMS '98, pp. 57–62. However, ink-jet printheads proposed in the above-mentioned patents and publication may satisfy some of the aforementioned requirements but do not completely provide an improved ink-jet printing approach.

FIG. 2 illustrates a back-shooting type ink ejector of another example of a conventional bubble-jet type ink-jet printhead, as disclosed in IEEE MEMS '98, pp. 57–62. In this configuration, a back-shooting technique refers to an ink ejection mechanism in which an ink droplet is ejected in a direction opposite to the direction in which a bubble expands.

As shown in FIG. 2, in the back-shooting type printhead, a heater 24 is disposed around a nozzle 26 formed in a nozzle plate 21. The heater 24 is connected to an electrode (not shown) for applying current and is protected by a protective layer 27 of a predetermined material formed on the nozzle plate 21. The nozzle plate 21 is formed on a substrate 20 and an ink chamber 23 is formed for each nozzle 26 in the substrate 20. The ink chamber 23 is in flow communication with an ink channel 25 and is filled with ink 29. The protective layer 27 for protecting the heater 24 is coated with an anti-wetting layer 30, thereby repelling the ink 29. In the ink ejector configured as described above, if current is applied across the heater 24, the heater 24 generates heat to form a bubble 28 within the ink 29, thereby filling the ink chamber 23. Then, the bubble 28 continues to expand by the heat supplied from the heater 24 and exerts pressure on the ink 29 within the ink chamber 23, thus causing the ink 29 near the nozzle 26 to be ejected through the nozzle 26 in the form of an ink droplet 29'. Then, ink 29 is absorbed through the ink channel 25 to refill the ink chamber 23.

However, the conventional back-shooting type ink-jet printhead has a problem in that a significant percentage of heat generated by the heater 24 is conducted and absorbed into portions other than the ink 29, such as the anti-wetting layer 30 and the protective layer 27 near the nozzle 26. It is desirable that the heat generated by the heater be used for boiling the ink 29 and forming the bubbles 28. However, a significant amount of heat is absorbed into other portions and the remainder of heat is actually used for forming the bubbles 28, thereby wasting energy supplied to form the bubble 28 and consequently degrading energy efficiency. This also increases the period from formation to collapse of the bubble 28. Thus, it is difficult to operate the ink-jet printerhead at a high frequency.

Furthermore, the heat conducted to other portions significantly increases the temperature of the overall printhead as a print cycle runs thereby making long-time stable operation of the printhead difficult due to significant thermal problems. For example, the heat produced by the heater is easily conducted to the surface near the nozzle 26 to increase the temperature of that portion excessively, thereby burning the anti-wetting layer 30 near the nozzle 26 and changing the physical properties of the anti-wetting layer 30.

SUMMARY OF THE INVENTION

In an effort to solve the above problems, it is a feature of an embodiment of the present invention to provide a bubble-jet type ink-jet printhead with a structure that satisfies the above-mentioned requirements and has an adiabatic layer disposed around a heater so that energy supplied to the heater for bubble formation may be effectively used, as well as provide a manufacturing method thereof.

Accordingly, an embodiment of the present invention provides a bubble-jet type ink-jet printhead including: a substrate integrally having a manifold for supplying ink, an ink chamber filled with ink to be ejected, and an ink channel for supplying ink from the manifold to the ink chamber; a nozzle plate on the substrate, the nozzle plate having a nozzle through which ink is ejected at a location corresponding to a central portion of the ink chamber; a heater formed in an annular shape on the nozzle plate and centered around the nozzle of the nozzle plate; an electrode, electrically connected to the heater, for applying current to the heater; and an adiabatic layer formed on the heater for preventing heat generated by the heater from being conducted upward from the heater.

Preferably, the adiabatic layer is centered around the nozzle in the shape of an annulus to cover the heater and the adiabatic layer is wider than the heater.

Furthermore, the adiabatic layer may have a space filled with air or vacuum.

Due to the presence of the adiabatic layer, most of the heat generated by the heater is transferred down to ink, thereby increasing energy efficiency and operating frequency while allowing for long-time stable operation of the printhead.

The present invention also provides a method of manufacturing a bubble-jet type ink-jet printhead including: forming a nozzle plate on a surface of a substrate; forming a heater having an annular shape on the nozzle plate; etching a bottom side of the substrate and forming a manifold for supplying ink; forming an electrode electrically connected to the heater on the nozzle plate; etching the nozzle plate and forming a nozzle having a diameter less than the diameter of the heater on the inside of the heater; forming an adiabatic layer on the heater in the shape of an annulus; etching the substrate exposed by the nozzle and forming an ink chamber; and etching the substrate and forming an ink channel for supplying ink from the manifold to the ink chamber.

Forming the adiabatic layer may include: forming an annular sacrificial layer on the heater; forming an annular slot on the sacrificial layer and exposing a portion of the sacrificial layer; and etching the sacrificial layer through the annular slot and forming the adiabatic layer having an interior space from which material has been removed.

Preferably, forming the adiabatic layer further includes sealing the adiabatic layer by cogging up the annular slot with a predetermined material layer. Also preferably, sealing the adiabatic layer is performed by means of low-pressure chemical vapor deposition (LPCVD) so that the adiabatic layer is maintained substantially in a vacuum state.

According to the present invention, the substrate integrally includes the ink chamber, the ink channel, and the ink supply manifold, and furthermore, the nozzle plate, the heater, and the adiabatic layer are integrally formed on the substrate, thereby allowing for a simple fabricating process and high volume production of printhead chips.

Another embodiment of the present invention provides a bubble-jet type ink-jet printhead formed on a silicon-on-insulator (SOI) wafer including a first substrate, an oxide layer stacked on the first substrate, and a second substrate stacked on the oxide layer. The ink-jet printhead of that embodiment includes: a manifold for supplying ink, an ink chamber having a substantially hemispherical shape filled with ink to be ejected, and an ink channel for supplying ink from the manifold to the ink chamber, wherein the manifold, the ink chamber, and the ink channel are integrally formed on the first substrate; a nozzle, formed at a location of the oxide layer and the second substrate corresponding to a central portion of the ink chamber, for ejecting ink; an adiabatic barrier formed on the second substrate for forming an annular heater centered around the nozzle by limiting a portion of the second substrate in the form of an annulus; a heater protective layer stacked on the second substrate for protecting the heater; and an electrode, formed on the heater protective layer and electrically connected to the heater, for applying current to the heater.

Preferably, the adiabatic barrier is formed along inner and outer circumferences to surround the heater, thereby insulating the heater from other portions of the second substrate. Preferably, the adiabatic barrier is formed in the shape of an annular groove and is sealed by the heater protective layer so that the interior space thereof is maintained in a vacuum state. Furthermore, the adiabatic barrier may be formed of predetermined insulating and adiabatic material.

The bubble-jet type ink-jet printhead configured as described above uses the adiabatic barrier to suppress the heat generated by the heater from being conducted to another portion, thereby increasing energy efficiency. Furthermore, the bubble-jet type ink-jet printhead provides for an ink ejector having a more robust structure on the SOI wafer.

The present invention also provides a method of manufacturing a bubble-jet type ink-jet printhead using an SOI wafer. The manufacturing method includes: preparing the SOI wafer having a first substrate, an oxide layer stacked on the first substrate, and a second substrate stacked on the oxide layer; etching the second substrate and forming an adiabatic barrier having the shape of an annular groove limiting an annular heater; forming a heater protective layer on the second substrate for protecting the heater and sealing the adiabatic barrier; forming an electrode electrically connected to the heater on the heater protective layer; etching a bottom side of the first substrate and forming a manifold for supplying ink; sequentially etching the heater protective layer, the second substrate, and the oxide layer on the inside of the heater with a diameter less than that of the heater and forming a nozzle; etching the first substrate exposed by the nozzle and forming an ink chamber having a substantially hemispherical shape; and etching the first substrate and forming an ink channel for supplying ink from the manifold to the ink chamber.

Preferably, the adiabatic barrier is formed along inner and outer circumferences to surround the heater, thereby insulating the heater from another portion of the second substrate. Forming the heater protective layer is performed by means of LPCVD so that the adiabatic barrier is maintained substantially in a vacuum state.

According to this embodiment of the present invention, components of the ink ejector are integrally formed on the SOI wafer, thereby allowing for a simple fabricating process and high volume production of printhead chips.

BRIEF DESCRIPTION OF THE DRAWINGS

The above features and advantages of the present invention will become readily apparent to those of ordinary skill in the art by describing in detail preferred embodiments thereof with reference to the attached drawings in which.

DETAILED DESCRIPTION OF THE INVENTION

Figure 1A:
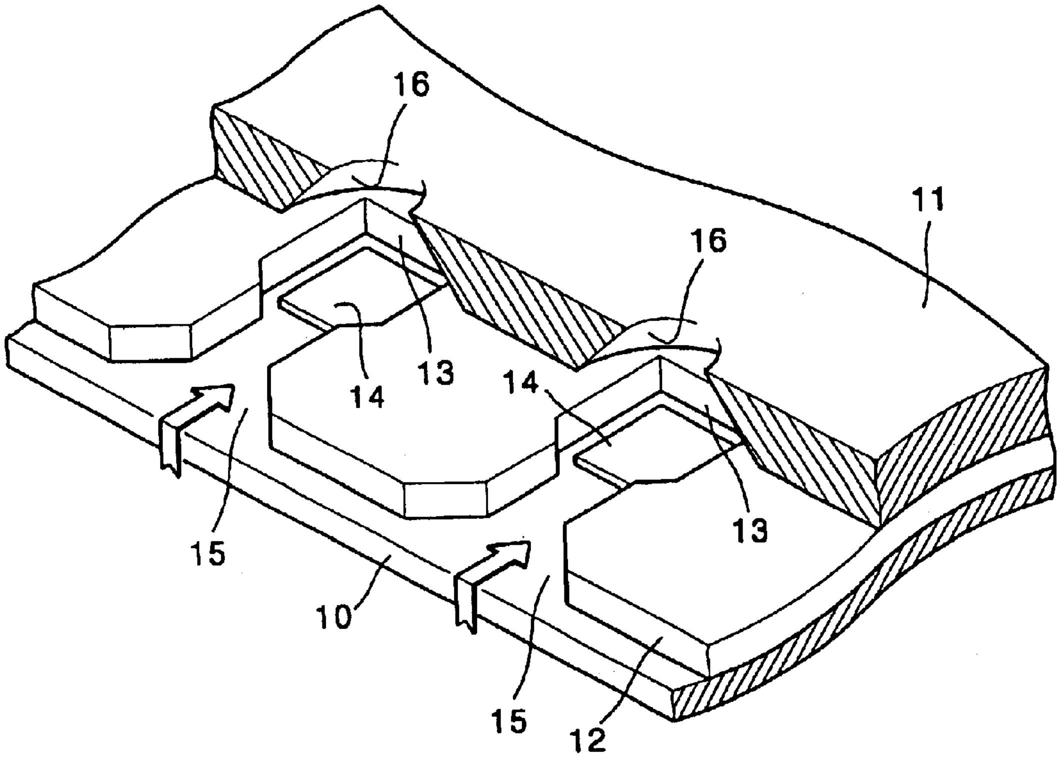
FIG. 1A (PRIOR ART)
FIG. 1A is a cross-sectional, perspective view illustrating an example of the structure of a conventional bubble-jet type ink-jet printhead.
Figure 1B:
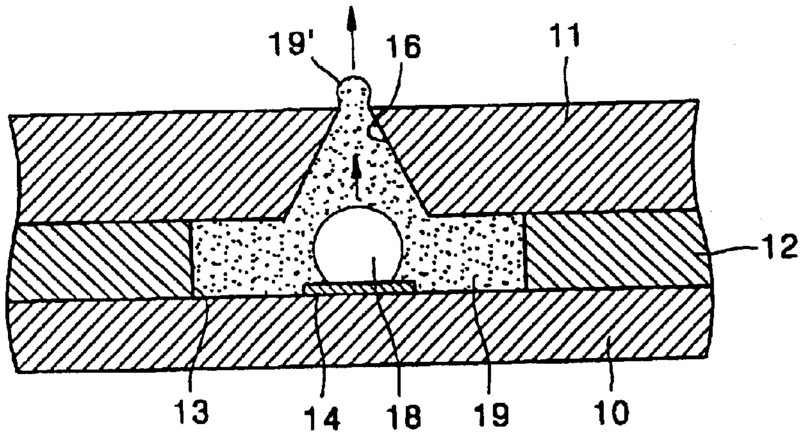
FIG. 1B (PRIOR ART)
FIG. 1B is a cross-sectional view illustrating a process of ejecting ink droplets of the printhead of FIG. 1A.

Korean Patent Application No. 2000-77167, filed Dec. 15, 2000, and Korean Patent Application No. 2001-3161, filed Jan. 19, 2001, both of which are entitled: "Bubble-jet Type Ink-jet Printhead and Manufacturing Method Thereof," are incorporated by reference herein in their entirety.

The present invention will now be described more fully with reference to the accompanying drawings, in which preferred embodiments of the invention are shown. This invention may, however, be embodied in many different forms and should not be construed as being limited to the embodiments set forth herein. Rather, these embodiments are provided so that this disclosure will be thorough and complete, and will fully convey the concept of the invention to those of ordinary skill in the art. In the drawings, the shape and thickness of an element may be exaggerated for clarity, and like reference numerals appearing in different drawings represent like elements. Further, it will be understood that when a layer is referred to as being "on" another layer or substrate, it may be directly on the other layer or substrate, or intervening layers may also be present.

Figure 2:
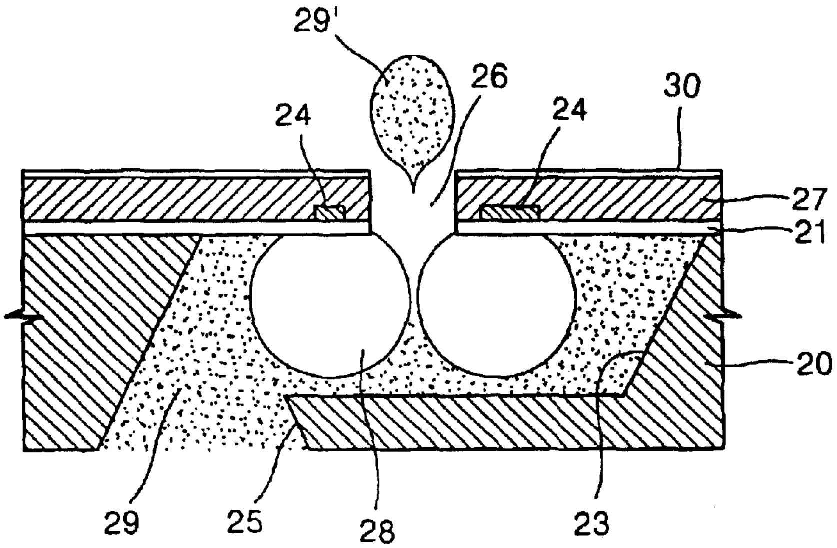
FIG. 2 (PRIOR ART)
FIG. 2 is a cross-sectional view of an ink ejector of another example of a conventional bubble-jet type ink-jet printhead.
Figure 3:
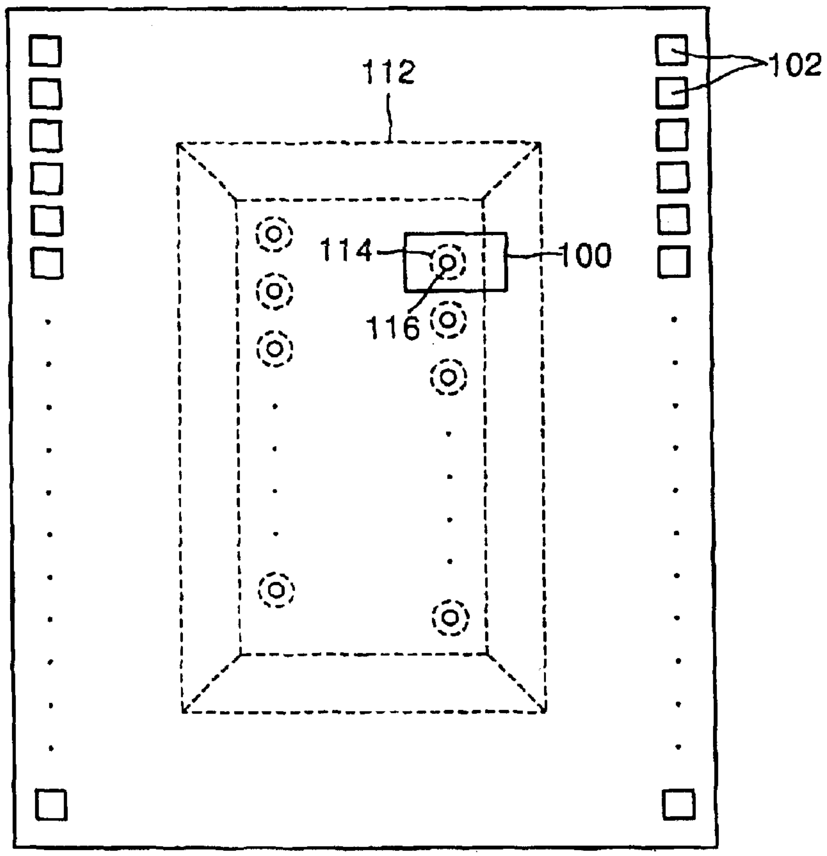
FIG. 3 is a schematic top view of an ink-jet printhead according to a first embodiment of the present invention.

Referring to FIG. 3, in a printhead according to a first embodiment of the present invention, ink ejectors 100 are arranged on an ink supply manifold 112, shown with a dotted line, in two rows in a staggered fashion. Bonding pads 102, to which wires are to be bonded, are electrically connected to each ink injector 100. Furthermore, the manifold 112 is in flow communication with an ink container (now shown) for containing ink. Although the ink ejectors 100 are arranged in two rows as shown in FIG. 3, they may be arranged in one row. In order to achieve higher resolution, the ink ejectors 100 may be arranged in three or more rows. The manifold 112 may be formed for each row of the ink ejectors 100. Moreover, although the printhead using a single color of ink is shown in FIG. 2, three or four groups of ink ejectors may be disposed, one group for each color, for color printing.

Figure 4:
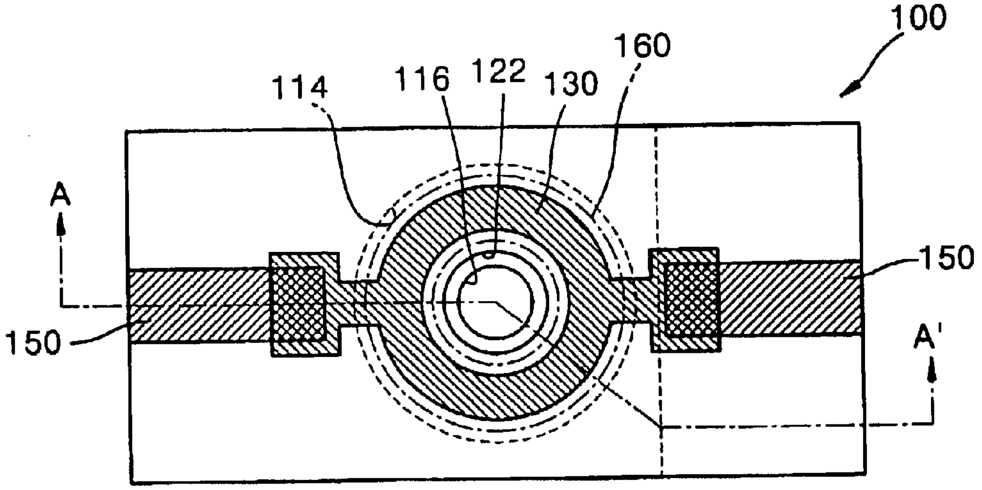
FIG. 4 is an enlarged top view of the ink ejector of FIG. 3.
Figure 5:
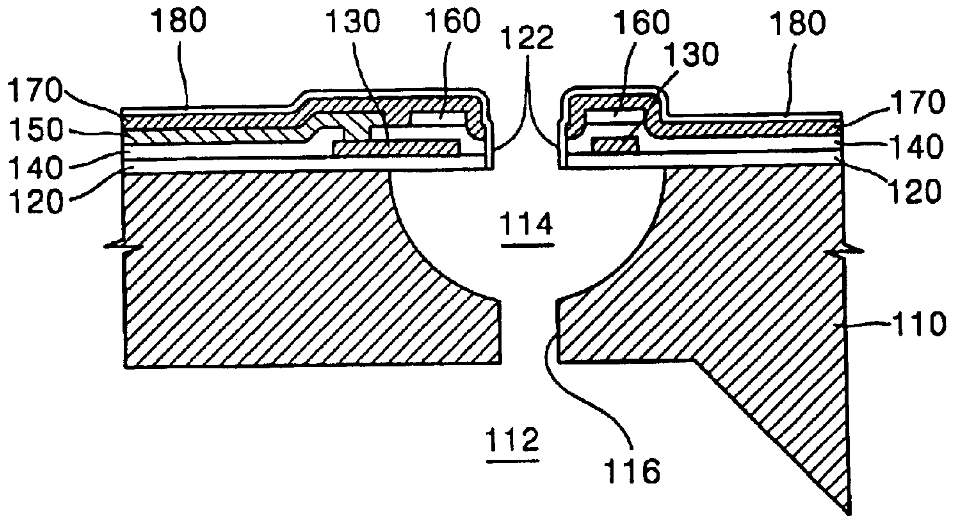
FIG. 5 is a cross-sectional view of a vertical structure of the ink ejector taken along line A–A' of FIG. 4.

FIG. 4 is an enlarged top view of the ink ejector 100 of FIG. 3, and FIG. 5 is a cross-section of a vertical structure of the ink ejector 100 taken along line A–A' of FIG. 4. As shown in FIGS. 3, 4 and 5, an ink chamber 114 filled with ink is formed on a top surface of a substrate 110 of the ink ejector 100, the manifold 112 for supplying ink to the ink chamber 114 is formed on a bottom side of the substrate 110, and an ink channel 116 linking the ink chamber 114 and the manifold 112 is formed at a central bottom surface of the ink chamber 114. Here, the substrate 110 is preferably formed from silicon widely used in manufacturing integrated circuits. The ink chamber 114 preferably has a substantially hemispherical shape. Since the diameter of the ink channel 116 affects a backflow of ink being pushed back into the ink channel 116 during ink ejection and the speed at which ink refills after ink ejection, the diameter of the ink channel 116 needs to be finely controlled during formation of the ink channel 116.

A nozzle plate 120 having a nozzle 122 is formed on the substrate 110 thereby forming an upper wall of the ink chamber 114. If the substrate 110 is formed of silicon, the nozzle plate 120 may be formed from an insulating layer such as a silicon oxide layer formed by oxidation of the silicon substrate 110 or a silicon nitride layer deposited on the substrate 110.

A heater 130 for bubble formation is formed on the nozzle plate 110 in an annular shape so that it is centered around the nozzle 122. The heater 130 consists of resistive heating elements such as polycrystalline silicon doped with impurities. A silicon nitride layer 140 may be formed on the nozzle plate 110 and the heater 130. Electrodes 150 are coupled to the heater 130 for applying pulse current.

An adiabatic layer 160 is provided on the heater 130 in an annular shape similar to that of the heater 130 with a silicon nitride layer 140 interposed therebetween. The adiabatic layer 160 prevents heat generated by the heater 130 from being conducted upward. To this end, the adiabatic layer 160 is preferably wider than the heater 130 to cover a large portion of the heater 130. The adiabatic layer 160 may be filled with air or maintained in a vacuum state, which will be described below in greater detail.

A tetraethylorthosilicate (TEOS) oxide layer 170 is formed on the silicon nitride layer 140, the electrode 150, and the adiabatic layer 160, and as described above, an anti-wetting layer 180 is formed thereon to repel ink from the surface near the nozzle 122.

Figure 6:
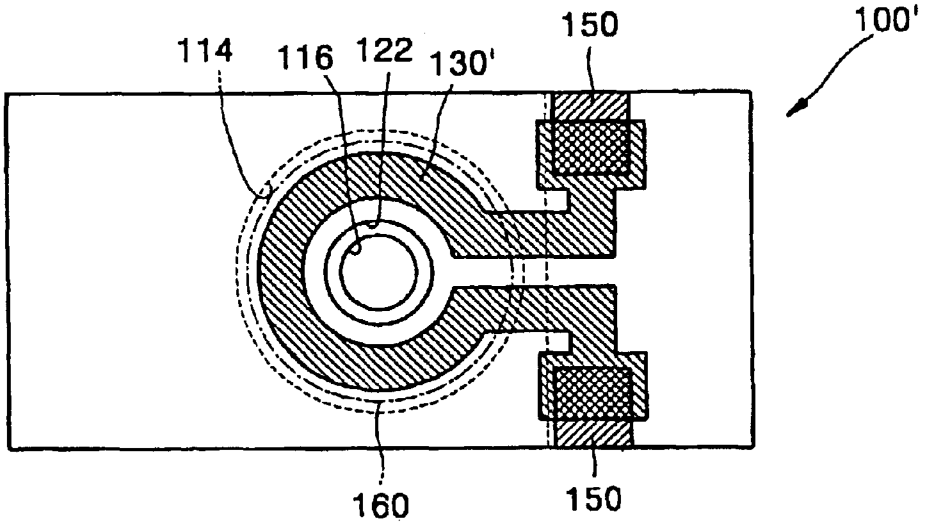
FIG. 6 is a top view of a modified example of the ink ejector of FIG. 4.

FIG. 6 is a top view showing a modified example of the ink ejector of FIG. 4. A heater 130' of an ink ejector 100' is formed substantially in the shape of the Greek letter omega (Ω), and one of the electrodes 150 is connected to each end of the heater 130'. More particularly, the two symmetrical annular parts of the heater 130 shown in FIG. 4 are coupled in parallel between the electrodes 150, whereas those of the Ω-shaped heater 130' shown in FIG. 6 are coupled in series therebetween.

Figure 7:
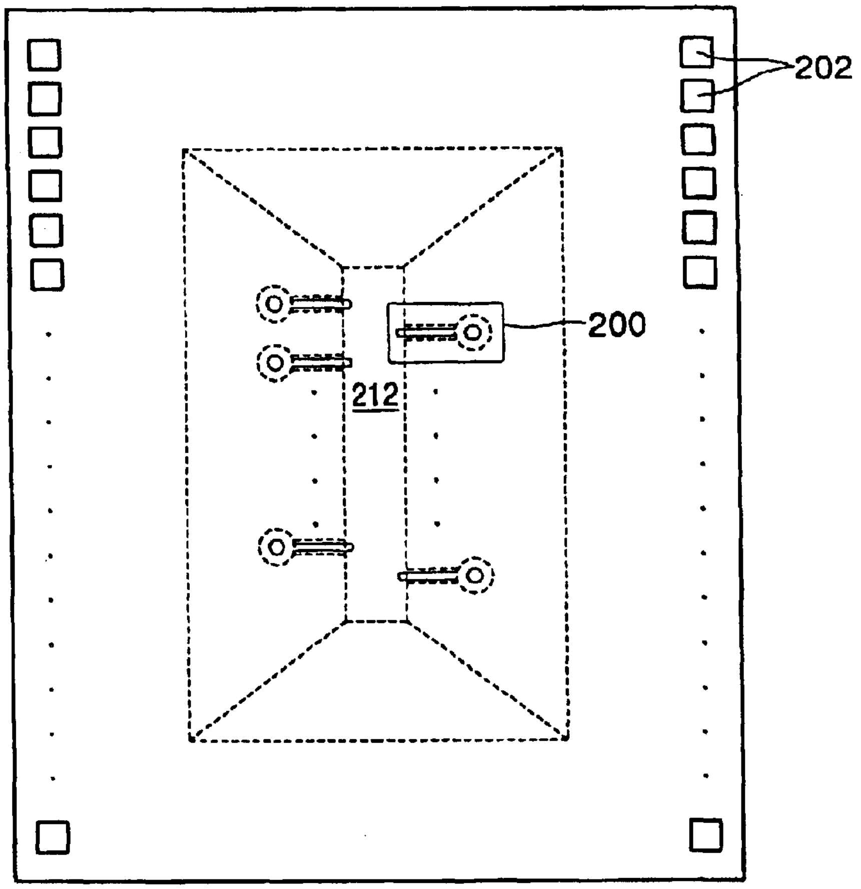
FIG. 7 is a schematic top view of an ink-jet printhead according to a second embodiment of the present invention.

FIG. 7 is a schematic top view of an ink-jet printhead according to a second embodiment of the present invention. Since this embodiment is very similar to the first embodiment, only the difference will now be described in detail.

Referring to FIG. 7, the printhead according to this embodiment includes ink ejectors 200 arranged in two rows in a staggered fashion along both sides of an ink supply manifold 212 shown with a dotted line, and bonding pads 202, to which wires are to be bonded, electrically connected to each ink ejector 200.

Figure 8A:
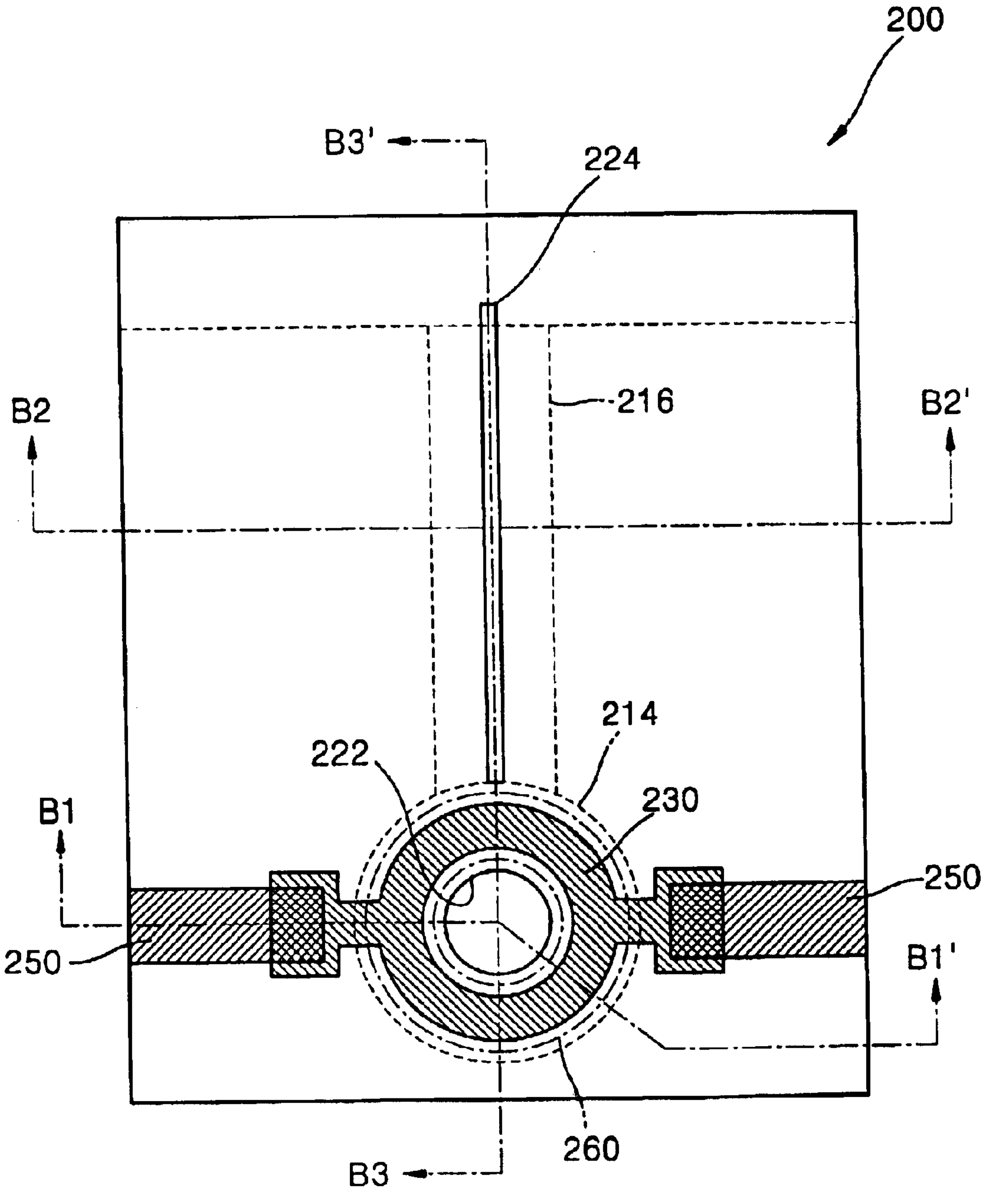
FIG. 8A is an enlarged top view of the ink ejector of FIG. 7, and FIGS. 8B–8D are cross-sectional views of vertical structures of the ink ejector taken along lines B1–B1', B2–B2', and B3–B3', respectively.
Figure 8B:
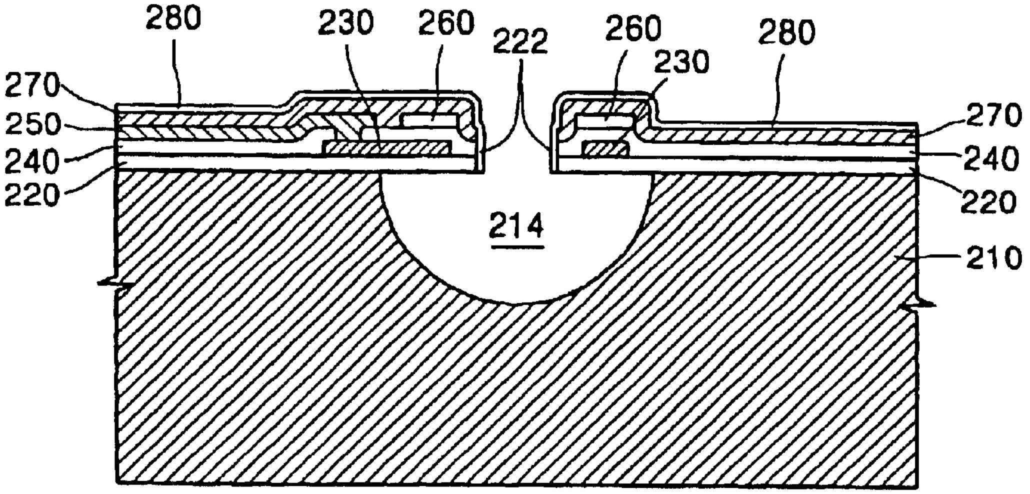
Figure 8C:
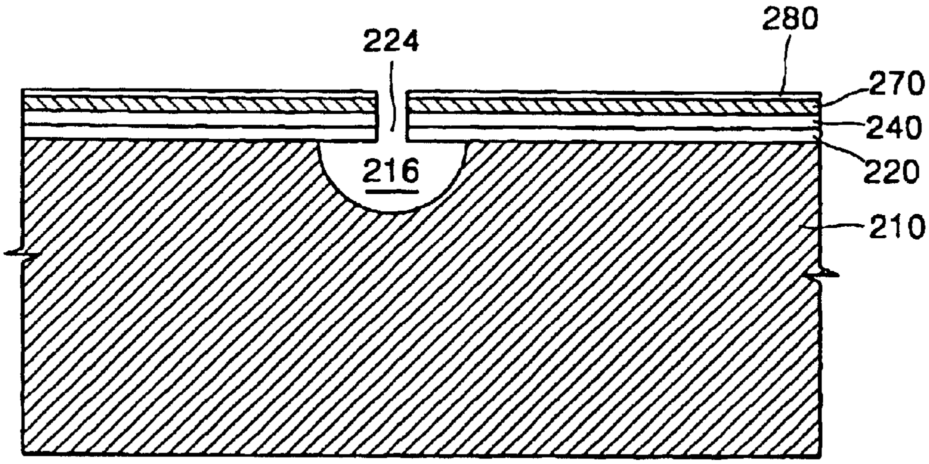
Figure 8D:
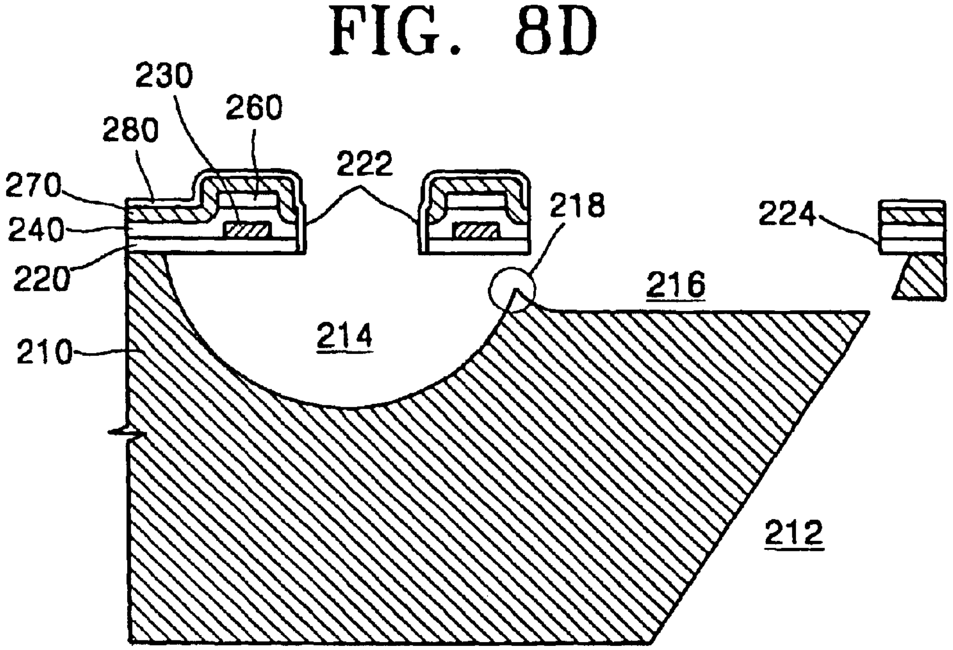

FIG. 8A is an enlarged plan view of the ink ejector 200 of FIG. 7, and FIGS. 8B–8D are cross-sections showing vertical structures taken along the lines B1–B1', B2–B2', and B3–B3' of FIG. 8A. Referring to FIGS. 8A–8D, each ink ejector 200 includes a substantially hemispherical ink chamber 214 filled with ink and an ink channel 216 formed shallower than the ink chamber 214 for supplying ink to the ink chamber 214, both of which are formed on a top surface of a substrate 210. Also, the ink ejector 200 includes a manifold 212 connected with the ink channel 216 on a bottom surface thereof for supplying ink to the ink channel 216, and a stopper 218 formed at a junction of the ink chamber 200 and the ink channel 216 for preventing a bubble from being pushed back into the ink channel 216 when the bubble expands.

A nozzle plate 220 having a nozzle 222 and a groove 224 for an ink channel are formed on the substrate 210, thereby forming an upper wall of the ink chamber 214. A heater 230 having an annular shape for forming a bubble and a silicon nitride layer 240 for protecting the heater 230 are formed on the nozzle plate 220. The heater 230 is connected to an electrode 250 formed of metal for applying pulse current. An adiabatic layer 260 is disposed on the heater 230. As described in the first embodiment, in order to prevent heat generated by the heater 230 from being conducted in a direction above the heater 230, the adiabatic layer 260 is formed in an annular shape similar to that of the heater 230, and is preferably wider than the heater 230 to cover a large portion of the heater 230. A TEOS oxide layer 270 is formed on the silicon nitride layer 240, the electrode 250, and the adiabatic layer 260, and an anti-wetting layer 280 is formed thereon to repel ink from the surface near the nozzle 222.

Figure 9:
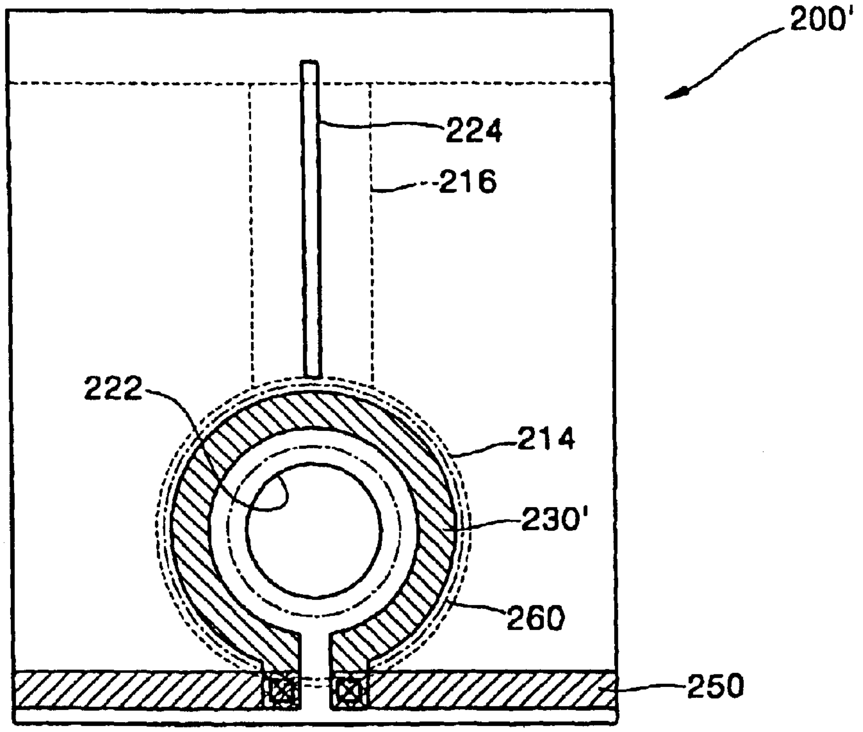
FIG. 9 is a top view of a modified example of the ink ejector of FIG. 8A.

FIG. 9 is a plan view of a modified example of the ink ejector 200 of FIG. 8A. Referring to FIG. 9, a heater 230' of an ink ejector 200' is formed substantially in the shape of the Greek letter omega (Ω), and an electrode 250 is coupled to each end of the heater 230'.

Figure 10A:
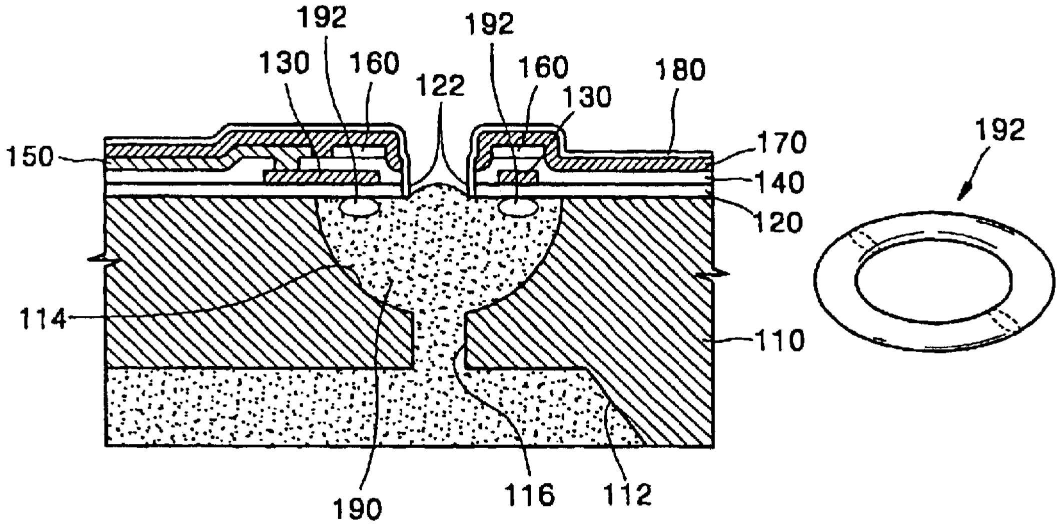
FIGS. 10A and 10B are cross-sectional views illustrating the ink ejection mechanism of the ink ejector of FIG. 4.

The ink ejection mechanism of the ink ejector 100 shown in FIGS. 4 and 5 will now be described with reference to FIGS. 10A and 10B. First, referring to FIG. 10A, ink 190 is supplied to the ink chamber 114 through the manifold 112 and the ink channel 116 by capillary action. If a pulse current is applied to the heater 130 when the ink chamber 140 is filled with the ink 190, heat is generated by the heater 130. The heat is prevented from being conducted upward from the heater 130 by the adiabatic layer 160, thereby transmitting most of the heat to the ink 190 through the underlying nozzle plate 120. The transmitted heat boils the ink 190 to form a bubble 192. The bubble 192 has an approximately doughnut shape conforming to the annular heater 130 as shown to the right side of FIG. 10A.

Figure 10B:
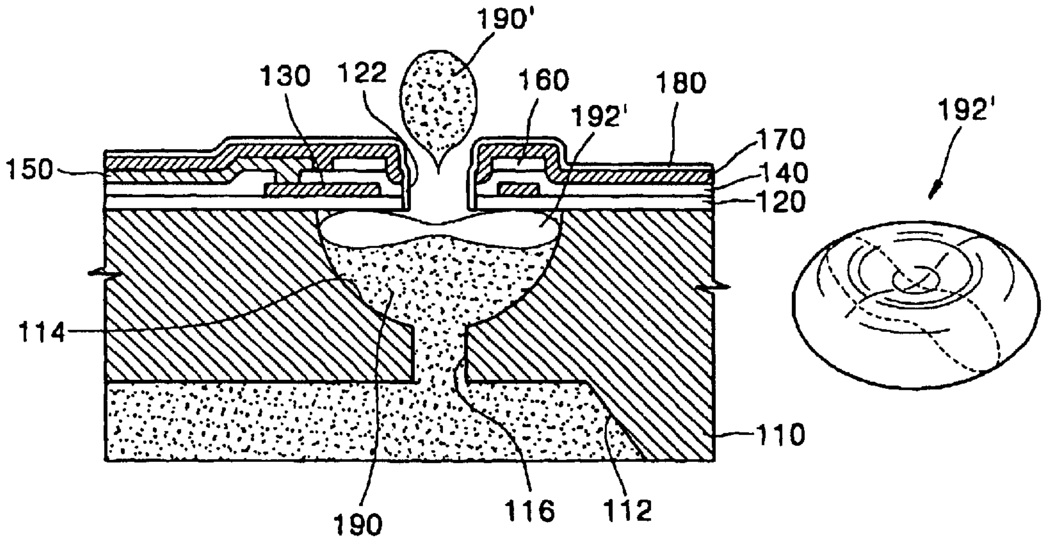

If the doughnut-shaped bubble 192 expands with the lapse of time, as shown in FIG. 10B, the bubble 192 coalesces below the nozzle 122 to form a substantially disk-shaped bubble 192', the center portion of which is concave. At the same time, the expanding bubble 192' causes an ink droplet 190' to be ejected from the ink chamber 114 through the nozzle 122. If the applied current cuts off, the heater 130 is cooled to shrink or collapse the bubble 192', and then the ink 190 refills the ink chamber 114.

In the ink ejection mechanism of the printhead according to this embodiment, the doughnut-shaped bubble 192 coalesces under the central portion of the nozzle 122 to cut off the tail of the ejected ink droplet 190', thereby preventing the formation of the satellite droplets. Furthermore, the area of the heater 130 having an annular or Ω-shape is wide enough to be rapidly heated and cooled, which shortens a cycle beginning with the formation of the bubble 192 or 192' and ending with the collapse thereof, thereby allowing for a quick response rate and high operating frequency. Furthermore, since the ink chamber 114 is hemispherical, a path along which the bubbles 192 and 192' expand is more stable as compared to a conventional ink chamber having the shape of a rectangular solid or a pyramid, and the formation and expansion of a bubble are quickly made thus ejecting ink within a relatively short time.

In particular, the adiabatic layer 160 formed on the heater 130 prevents heat generated by the heater 130 from being conducted upward from the heater 130 so that most of the heat is transmitted to the ink 190. Since the heat generated by the heater 130 is prevented from being conducted to the area above the heater 130 in this way, the temperature of the surface above the heater 130 is maintained low compared to that in a conventional printhead. Thus, as described above, the heat does not burn the anti-wetting layer 180 or change the physical properties thereof to lose hydrophobicity.

Furthermore, a greater amount of heat energy generated by the heater 130 is transferred to the ink 190, thereby increasing energy efficiency and ink operating frequency. That is, if the energy supplied to the heater 130 is fixed, the temperature of ink rises at a higher speed compared to that in a conventional printhead, thereby shortening a cycle beginning with the formation of the bubbles 192 and 192' and ending with the collapse of the bubbles, which results in a high operating frequency. If a predetermined operating frequency is to be obtained, the energy supplied to the heater 130 is reduced compared to that in a conventional printhead, thereby improving energy efficiency. Furthermore, the heat generated by the heater 130 is prevented from being conducted to a portion other than the ink 190, thereby preventing the temperature of the overall printhead from rising and thus enabling the printhead to be stably operated for long periods of time.

In addition, the expansion of the bubbles 192 and 192' is limited within the ink chamber 114, thereby preventing a backflow of the ink 190 and thus cross-talk between adjacent ink ejectors. Furthermore, if the diameter of the ink channel 116 is less than that of the nozzle 122, the arrangement is very effective in preventing a backflow of the ink 190.

A method of manufacturing an ink-jet printhead according to the present invention will now be described. FIGS. 11–19 are cross-sections taken along line A–A' of FIG. 4 showing a method of manufacturing a printhead having the ink ejector shown in FIGS. 4 and 5 according to a first embodiment of the present invention.

Figure 11:
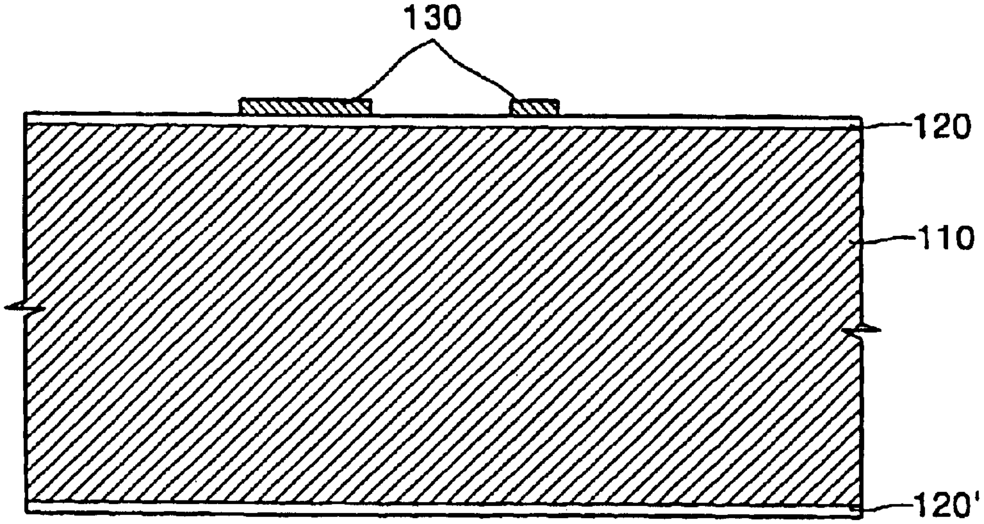
FIGS. 11–19 are cross-sectional views showing a process of manufacturing an ink-jet printhead having the ink ejector with the structure shown in FIGS. 4 and 5 according to a first embodiment of the present invention.

Referring to FIG. 11, a silicon substrate having a crystal orientation of [100 ] and having a thickness of about 500 μm is used as a substrate 110 in this embodiment. This is because the use of a silicon wafer widely used in the manufacture of semiconductor devices allows for high volume production. Next, if the silicon wafer is wet or dry oxidized in an oxidation furnace, the top and bottom surfaces of the silicon substrate 110 are oxidized, thereby allowing silicon oxide layers 120 and 120' to grow. The silicon oxide layer 120 formed on the top surface of the substrate 110 will later be a nozzle plate where a nozzle is formed.

A very small portion of the silicon wafer is shown in FIG. 11, and tens to hundreds of printhead chips according to the present invention are fabricated on a single wafer. Furthermore, as shown in FIG. 11, the silicon oxide layers 120 and 120' are developed on top and bottom surfaces of the substrate 110, respectively. This is because a batch type oxidation furnace having an oxidation atmosphere is used on the bottom surface of the silicon wafer as well. However, if a single wafer type oxidation apparatus exposing only the top surface of a wafer is used, the silicon oxide layer 120' is not formed on the bottom surface of the substrate 110. For simplification, it will now be shown that a different material layer such a polycrystalline silicon layer, a silicon nitride layer and a tetraethylorthosilicate (TEOS) oxide layer as will be described below is formed only on the top surface of the substrate 110.

Next, an annular heater 130 is formed on the silicon oxide layer 120 formed on the top surface of the substrate 110 by depositing polycrystalline silicon doped with impurities over the silicon oxide layer 120 and patterning the doped polycrystalline silicon in the form of an annulus. Specifically, the polycrystalline silicon layer doped with impurities may be formed by low-pressure chemical vapor deposition (LPCVD) using a source gas containing phosphorous (P) as impurities, in which the polycrystalline silicon is deposited to a thickness of between about 0.7–1 μm. The thickness to which the polycrystalline silicon layer is deposited may be in different ranges so that the heater 130 may have appropriate resistance considering its width and length. The polycrystalline silicon layer deposited over the silicon oxide layer 120 is patterned by photolithography using a photomask and photoresist and an etching process using a photoresist pattern as an etch mask.

Figure 12:
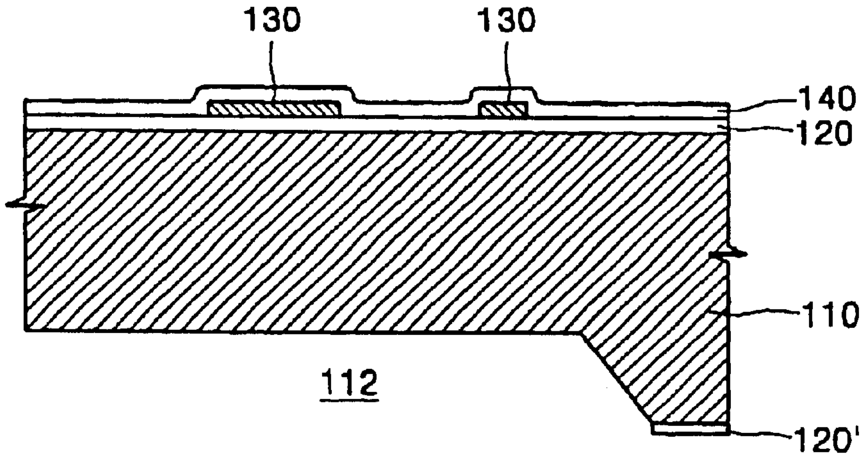

FIG. 12 illustrates a state in which a silicon nitride layer 140 has been deposited over the resulting structure of FIG. 11 and then a manifold 112 has been formed by etching the substrate 110 from its bottom surface. The silicon nitride layer 140 may be deposited to a thickness of about 0.5 μm as a protective layer of the heater 130 using LPCVD. The manifold 112 is formed by obliquely etching the bottom surface of the wafer. More specifically, an etch mask that limits a region to be etched is formed on the bottom surface of the wafer, and wet etching is performed for a predetermined time using tetramethyl ammonium hydroxide (TMAH) as an etchant. Accordingly, since etching in a crystal orientation of [111] is slower than etching in other orientations, the manifold 112 is formed with a side surface inclined at 54.7 degrees. Although it has been described that the manifold 112 is formed by obliquely etching the bottom surface of the substrate 110, the manifold 112 may be formed by anisotropic etching.

Figure 13:
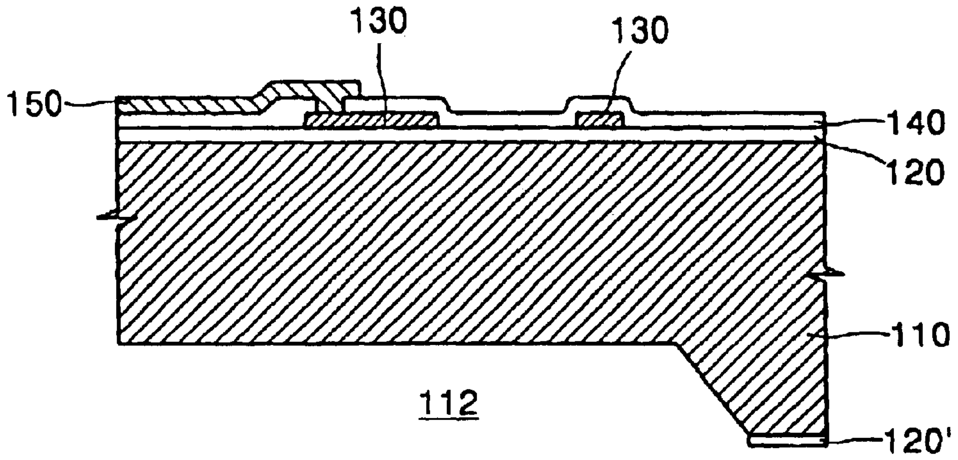

FIG. 13 illustrates a state in which an electrode 150 has been formed. Specifically, a portion of the silicon nitride layer 140 to which the top of the heater 130 will be connected to the electrode 150 is etched to expose the heater 130. The electrode 150 is formed by depositing metal having good conductivity and patterning capability such as aluminum or aluminum alloy to a thickness of about 1 μm using a sputtering technique and patterning it. In this case, the metal layer of the electrode 150 is simultaneously patterned to form wiring lines (not shown) and the bonding pad (102 of FIG. 2) in other portions of the substrate 110.

Figure 14:
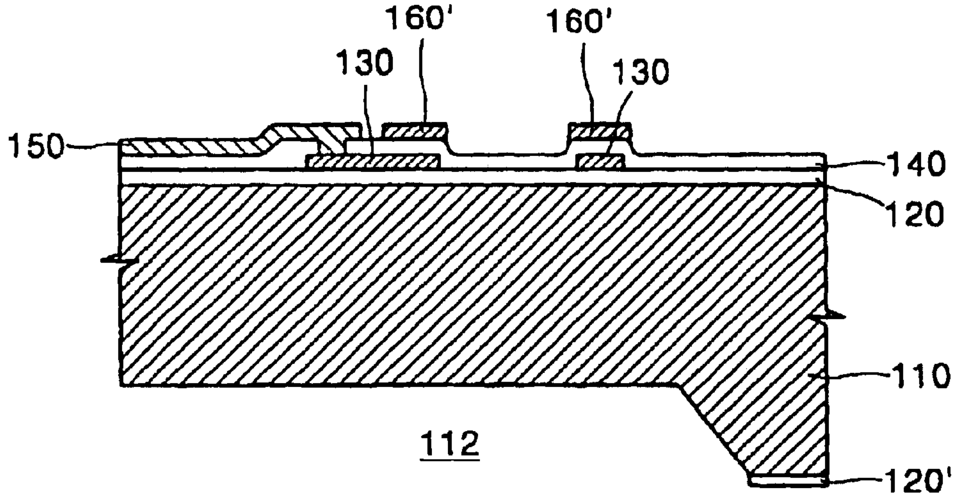

FIG. 14 illustrates a state in which a sacrificial layer 160' has been formed on the heater 130. The sacrificial layer 160' is formed by depositing polycrystalline silicon to a thickness of about 1 μm on the silicon nitride layer 140 overlying the heater 130 and patterning it in the form of an annulus. Specifically, the polycrystalline silicon may be deposited by means of LPCVD, and its width is preferably greater than that of the heater 130. The sacrificial layer 160' becomes an adiabatic layer for preventing heat generated by the heater 130 from being conducted above the heater 130.

Figure 15:
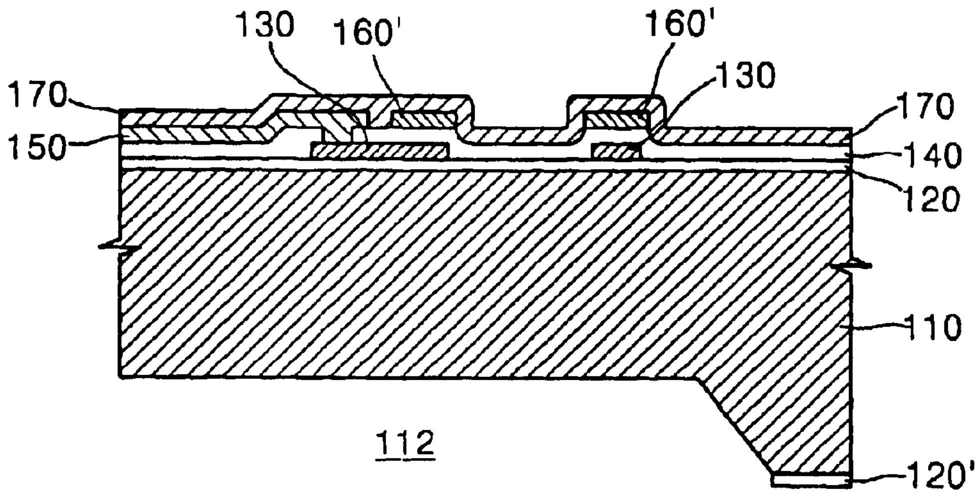

Then, as shown in FIG. 15, a TEOS oxide layer 170 is deposited over the substrate 110. The TEOS oxide layer 170 is formed by CVD, in which the TEOS oxide layer 170 may be deposited to a thickness of about 1 μm at low temperature where the electrode 150 and the bonding pad made from aluminum or aluminum alloy are not transformed, for example, at no greater than 400° C.

Figure 16:
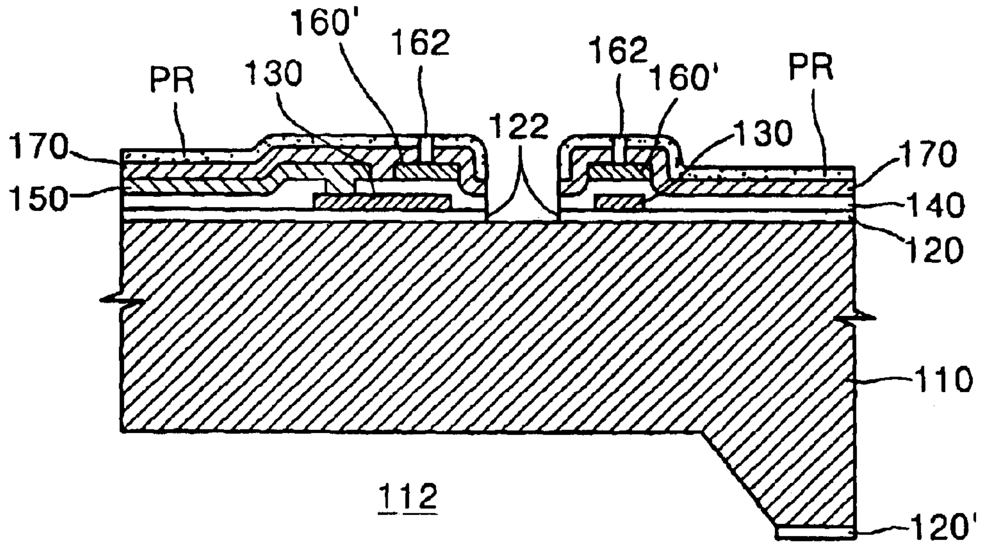

Next, as shown in FIG. 16, photoresist is applied over the substrate 110 and patterned to form a photoresist pattern PR. The photoresist pattern PR exposes a portion of the TEOS oxide layer 170 at which a nozzle 122 is to be formed and a portion of the TEOS oxide layer 170 on top of the sacrificial layer 160' in the form of annulus. Using the photoresist pattern PR as an etch mask, the TEOS oxide layer 170, the silicon nitride layer 140, and the silicon oxide layer 120 are sequentially etched to form the nozzle 122 having a diameter of about 16–20 μm, and the TEOS oxide layer 170 on top of the sacrificial layer 160' is etched to form an annular slot 162 having a width of about 1 μm. Although it has been described that the nozzle 122 is formed by sequentially etching the TEOS oxide layer 170, the silicon nitride layer 140, and the silicon oxide layer 120, it may be formed by etching the silicon nitride layer 140 and the silicon oxide layer 120 in the step shown in FIG. 13.

Figure 17:
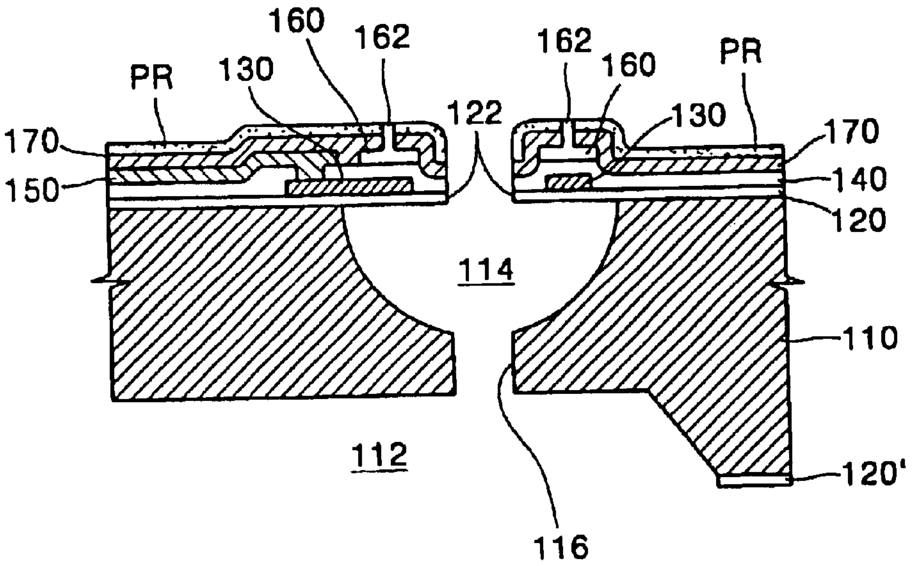

FIG. 17 illustrates a state in which the substrate 110 and the sacrificial layer 160' exposed by the photoresist pattern PR are etched to form an ink chamber 114, an ink channel

116, and an adiabatic layer 160. First, the ink chamber 114 may be formed by isotropically etching the substrate 110 using the photoresist pattern PR as an etch mask. More specifically, the substrate 110 is dry etched for a predetermined period of time using $XeF_2$ gas or $BrF_3$ gas as an etch gas. Then, as shown in FIG. 17, the substantially hemispherical ink chamber 114 is formed with a depth and a radius of about 20 μm. At the same time, the sacrificial layer (160' of FIG. 15) is etched through the annular slot 162 to form the adiabatic layer 160 having an interior space from which the material layer, i.e., the polycrystalline silicon layer, has been removed. The ink chamber 114 and the adiabatic layer 160 may be simultaneously or sequentially formed.

The ink chamber 114 may be formed by anisotropically etching the substrate 110 using the photoresist pattern PR as an etch mask and then isotropically etching it. That is, the silicon substrate 110 may be anisotropically etched by means of inductively coupled plasma etching or reactive ion etching using the photoresist pattern PR as an etch mask to form a hole (not shown) having a predetermined depth. Then, the silicon substrate 110 is isotropically etched in the manner described above. Alternatively, the ink chamber 114 may be formed by changing a part of the substrate 110 in which the ink chamber 114 is to be formed into a porous silicon layer and selectively etching and removing the porous silicon layer.

Subsequently, the substrate 110 is anisotropically etched using the photoresist pattern PR as an etch mask to form the ink channel 116 linking the ink chamber 114 and the manifold 112 at the bottom of the ink chamber 114. The anisotropic etching may be performed by inductively coupled plasma etching or reactive ion etching as described above.

Figure 18:
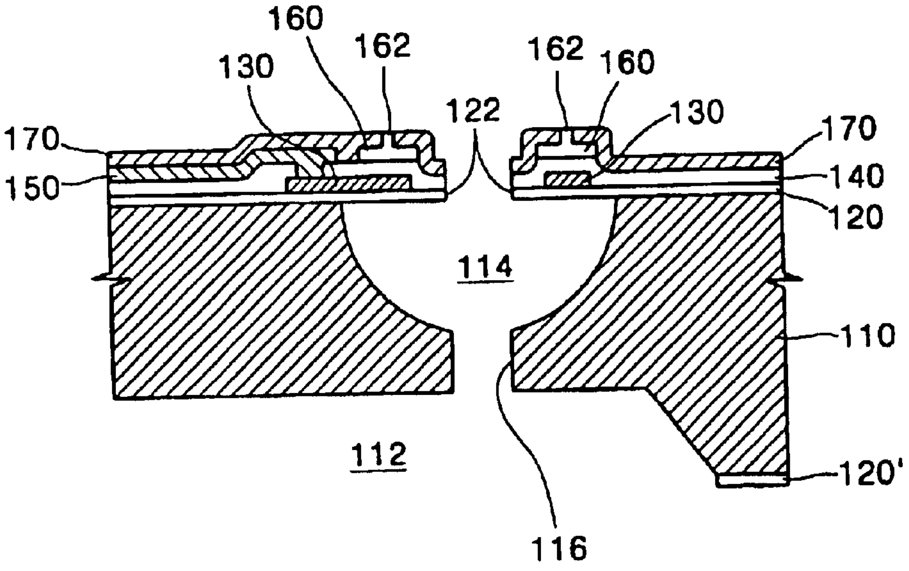

FIG. 18 illustrates a state in which the photoresist pattern PR is removed by ashing and stripping from the resulting structure shown in FIG. 17. The anti-wetting layer (180 of FIG. 5) may be applied over the uppermost surface in this state, thereby completing the printhead according to this embodiment. Since the adiabatic layer 160 is exposed to the outside through the annular slot 162 in the state shown in FIG. 18, ink or other foreign material tends to break into the adiabatic layer 160 through the annular slot 162, thereby degrading the adiabatic efficiency thereof. Thus, as shown in FIG. 19, it is preferable that the annular slot 162 is clogged up before forming the anti-wetting layer.

Figure 19:
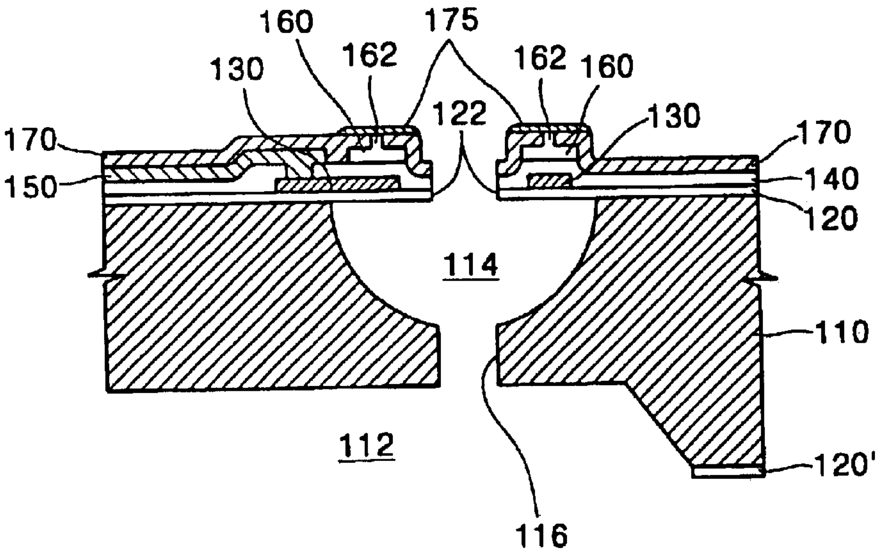

FIG. 19 illustrates a state in which the annular slot 162 has been clogged up by a silicon nitride layer 175 formed on the TEOS oxide layer 170 around the annular slot 162. The silicon nitride layer 175 is formed by depositing silicon nitride to a thickness of about 0.5–1 μm by CVD and patterning the silicon nitride. The thickness to which the silicon nitride layer 175 is deposited varies depending on the width of the annular slot 162. That is, the silicon nitride layer 175 is sufficiently thick to clog up the annular slot 162. For example, if the width of the annular slot 162 is about 1 μm, the thickness of the silicon nitride layer 175 is 0.5 μm or greater. The silicon nitride layer 175 may be replaced with an oxide layer or may be formed over the entire surface of the TEOS oxide layer 170. In this case, the adiabatic layer 160 is a sealed air adiabatic layer filled with only air. If the silicon nitride layer 175 is deposited by LPCVD, the adiabatic layer 160 is a vacuum adiabatic layer, which is maintained in a vacuum state.

FIGS. 20–23 are cross-sectional views taken along line B3–B3' of FIG. 8A illustrating a process for manufacturing an ink-jet printhead having an ink ejector with the structure shown in FIGS. 8A–8D according to a second embodiment of the present invention. The manufacturing method according to the second embodiment of this invention is similar to the first embodiment except for the step of forming an ink channel. That is, the second embodiment is the same as the first embodiment up to the step of forming the TEOS oxide layer 170 shown in FIG. 15. Both embodiments are different in the subsequent step for forming an ink channel. Thus, the method of manufacturing the printhead having the ink ejector shown in FIG. 8A according to the second embodiment of the present invention will now be described with respect to the difference.

Figure 20:
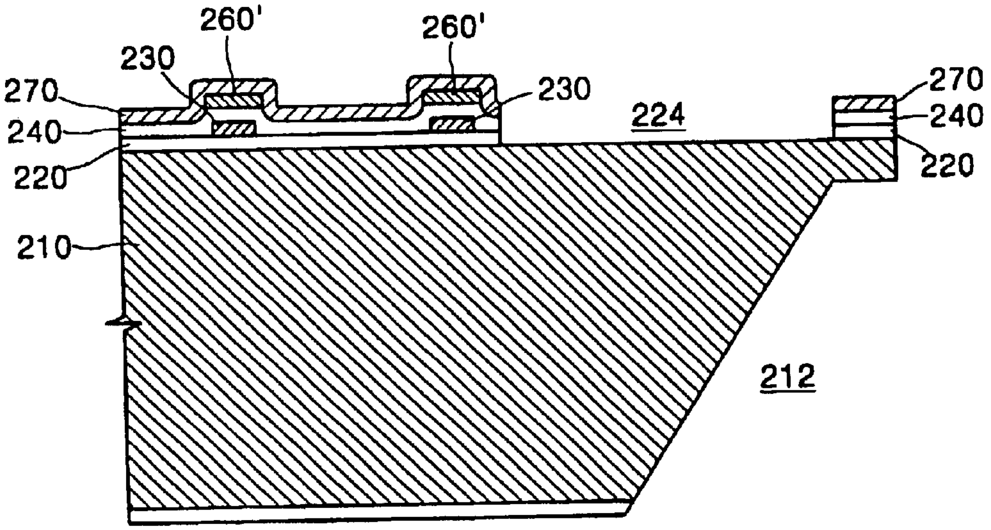
FIGS. 20–23 are cross-sectional views showing a process of manufacturing an ink-jet printhead having the ink ejector with the structure shown in FIGS. 8A–8D according to a second embodiment of the present invention.

As shown in FIG. 20, a TEOS oxide layer 270 is formed and patterned to form a groove 224 for an ink channel on the outside of a heater 230 in a straight line up to the area above a manifold 212. The groove 224 may be formed by sequentially etching the TEOS oxide layer 270, a silicon nitride layer 240, and a silicon oxide layer 220. Also, the groove 224 has a length of about 50 μm and a width of about 2 μm.

Figure 21:
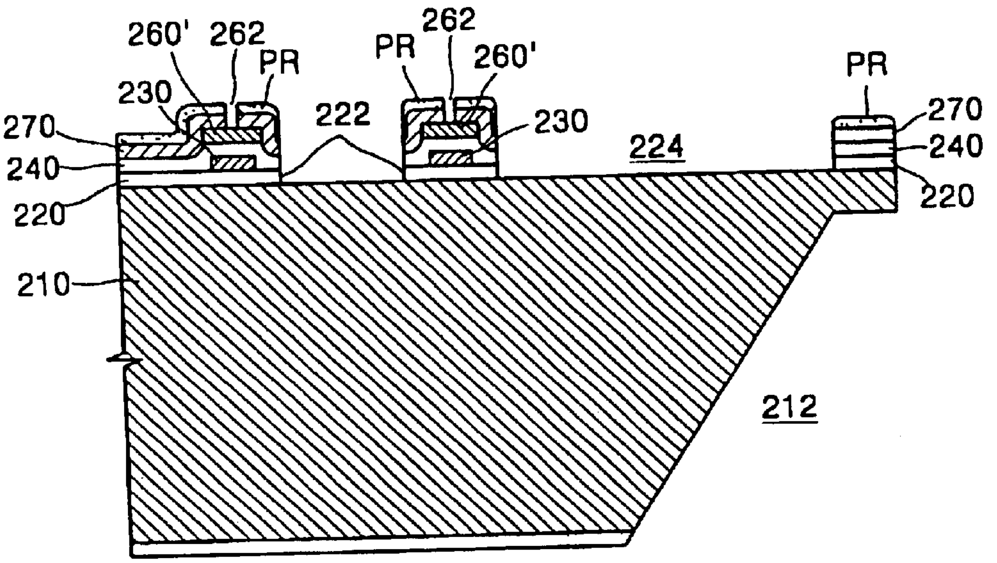

Then, as shown in FIG. 21, photoresist is applied over a substrate 210 and patterned to form the photoresist pattern PR. The photoresist pattern PR exposes a portion of the TEOS oxide layer 270 at which a nozzle 222 is to be formed and a portion of the TEOS oxide layer 270 on top of a sacrificial layer 260' in the form of an annulus. Then, using the photoresist pattern PR as an etch mask, the TEOS oxide layer 270, the silicon nitride layer 240, and the silicon oxide layer 220 are sequentially etched to form the nozzle 222 having a diameter of about 16–20 μm, and the TEOS oxide layer 270 on top of the sacrificial layer 260' is etched to form an annular slot 262 having a width of about 1 μm.

Figure 22:
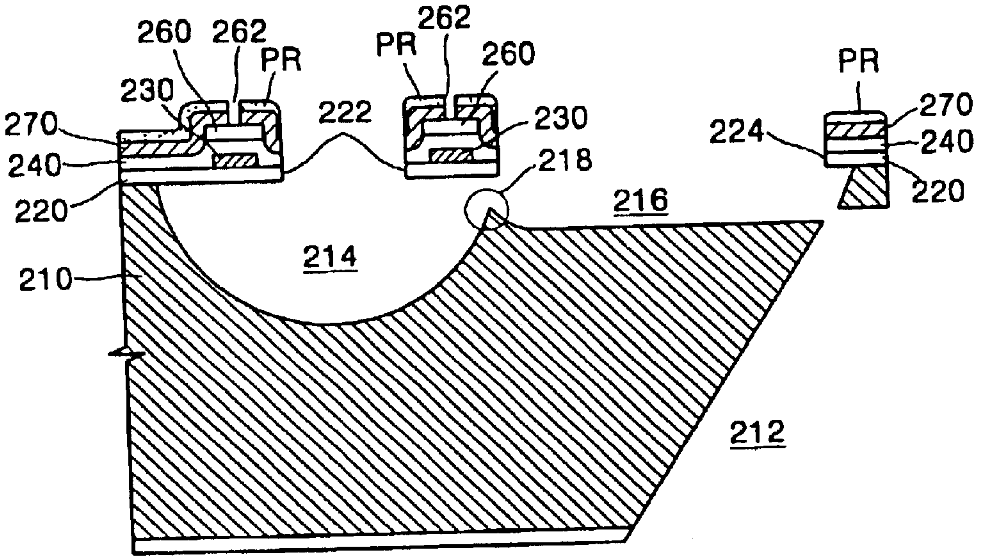

FIG. 22 illustrates a state in which the substrate 210 and the sacrificial layer 260' exposed by the photoresist pattern PR are etched to form an ink chamber 214, an ink channel 216, and an adiabatic layer 260. First, the ink chamber 114 may be formed by isotropically etching the substrate 210 using the photoresist pattern PR as an etch mask. More specifically, the substrate 210 is dry etched for a predetermined period of time using $XeF_2$ gas or $BrF_3$ gas as an etch gas. Then, as shown in FIG. 22, the substantially hemispherical ink chamber 214 is formed with a depth and a radius of about 20 μm, and the ink channel 216 for linking the ink chamber 214 with the manifold 212 is formed with a depth and a radius of about 8 μm. Also, a projecting stopper 218 is formed by etching at the junction of the ink chamber 214 and the ink channel 216. At the same time, the sacrificial layer (260' of FIG. 20) is etched through the annular slot 262 to form the adiabatic layer 260 having an interior space from which the material layer, i.e., the polycrystalline silicon layer, has been removed. The ink chamber 214, the ink channel 216, and the adiabatic layer 260 may be simultaneously or sequentially formed.

Figure 23:
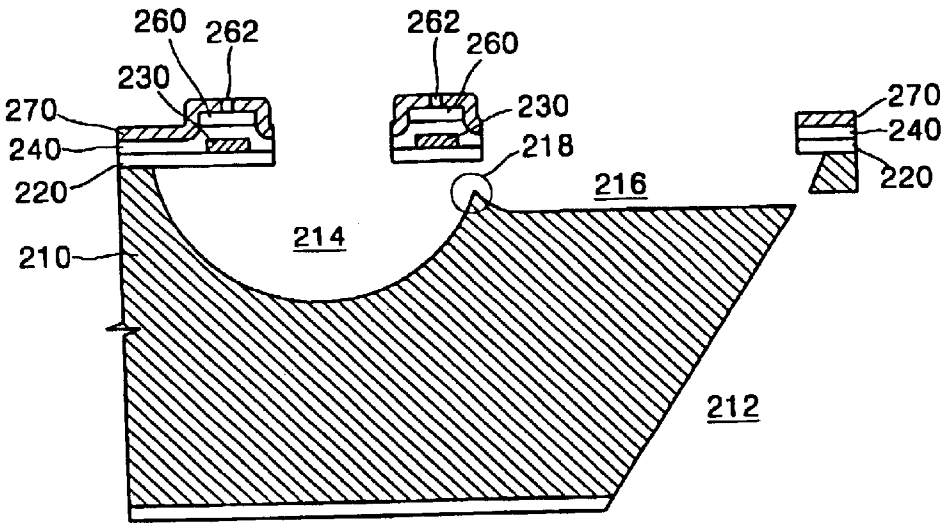

FIG. 23 illustrates a state in which the photoresist pattern PR is removed from the resulting structure shown in FIG. 17 by ashing and stripping. The anti-wetting layer (280 of FIG. 8D) may be applied over the uppermost surface in this state to complete the printhead according to this embodiment. However, like in the first embodiment, it is preferable that the annular slot 262 is clogged up before coating the anti-wetting layer in order to close the adiabatic layer 260. This step is carried out in the same manner as the counterpart step in the first embodiment is carried out.

Figure 24:
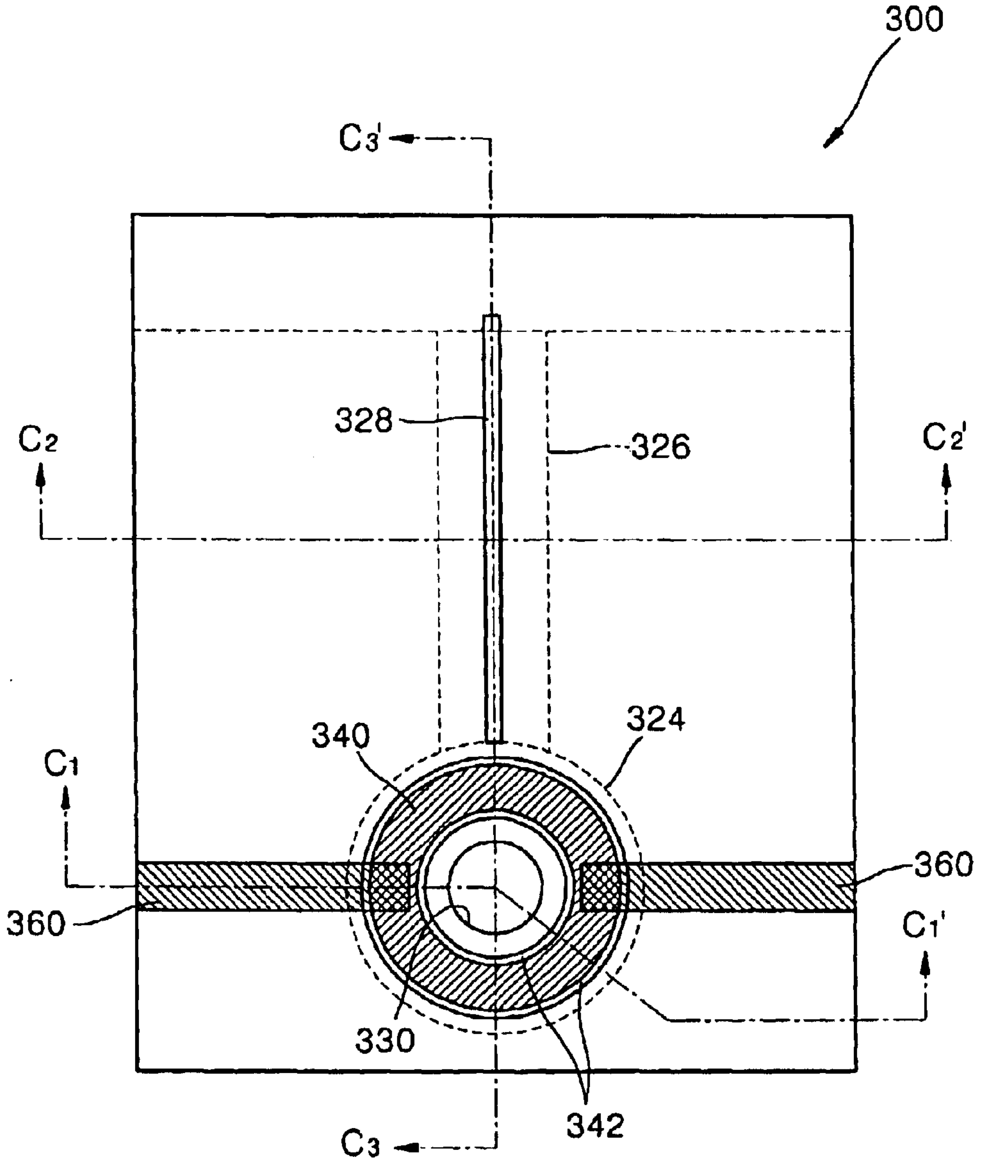
FIG. 24 is a top view of an ink ejector of an ink-jet printhead according to a third embodiment of the present invention.
Figure 25A:
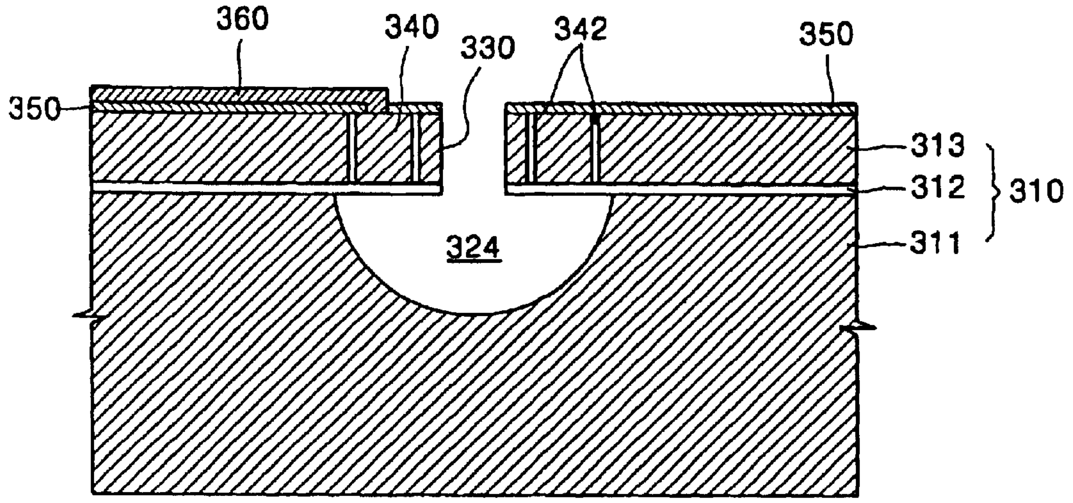
FIGS. 25A–25C are cross-sectional views of vertical structures of the ink ejector taken along lines C1–C1', C2–C2', and C3–C3' of FIG. 24, respectively.
Figure 25B:
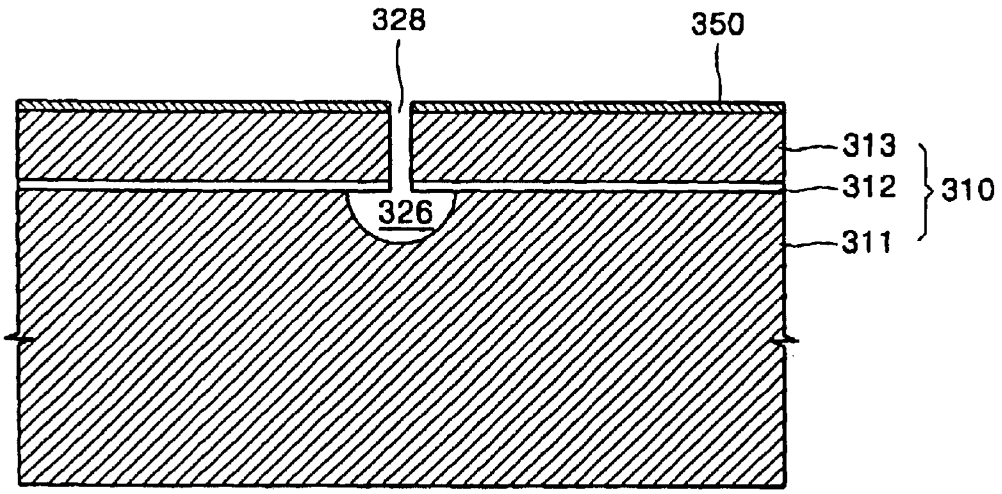
Figure 25C:
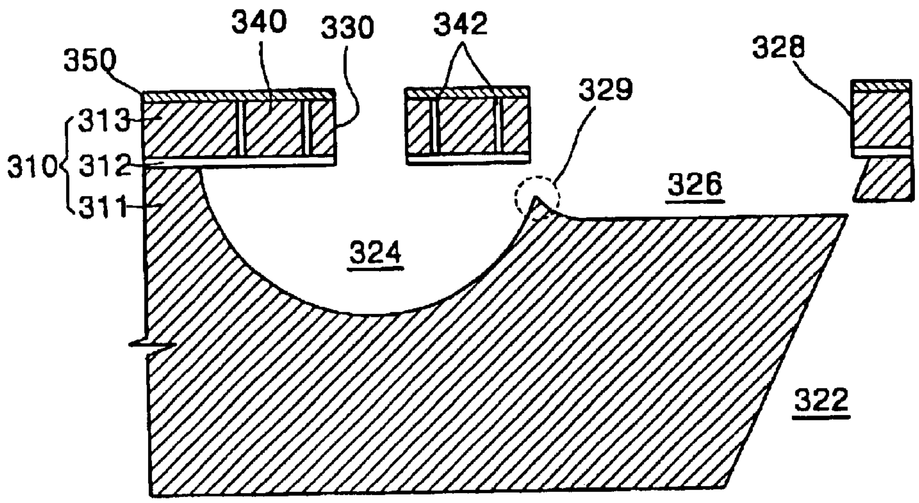

FIG. 24 is an enlarged top view of an ink-jet printhead according to a third embodiment of the present invention, and FIGS. 25A–25C are cross-sections of the vertical structures of the ink ejector taken along lines C1–C1', C2–C2', and C3–C3' of FIG. 24, respectively.

Referring to FIGS. 24 and 25A–25C, an ink ejector 300 of the ink-jet printhead according to this embodiment is configured in the way shown in FIG. 7 basically using the stacked structure of a silicon-on-insulator (SOI) wafer 310. The SOI wafer 310 typically has a structure in which a first substrate 311, an oxide layer 312 formed on the first substrate 311, and a second substrate 313 bonded to the oxide layer 312 are stacked. The first substrate 311 is formed of monocrystalline silicon and has a thickness of about several hundreds of micrometers. The oxide layer 312 is formed by oxidizing the surface of the first substrate 311 and has a thickness of about 1 μm. The second substrate 313 is typically formed of monocrystalline silicon and has a thickness of about several tens of micrometers, for example, 20 μm.

An ink chamber 324 filled with ink, which has a substantially hemispherical shape, and an ink channel 326 formed shallower than the ink chamber 324 for supplying ink to the ink chamber 324 are formed on the top surface of the first substrate 311 of the SOI wafer 310. A manifold 322 in flow communication with the ink channel 326 for supplying ink to the ink channel 326 is formed on the bottom surface of the first substrate 311. A stopper 329 is formed at the junction of the ink chamber 324 and the ink channel 326 for preventing an expanding bubble from being pushed back into the ink channel 326.

The oxide layer 312 and the second substrate 313 of the SOI wafer 310 form an upper wall of the ink chamber 324 formed on the surface of the substrate 311 as described above. Since the upper wall of the ink chamber 324 has a thickness of about 20 μm due to the thickness of the second substrate 313, the ink chamber 324 and the ink ejector 300 are more robust.

A nozzle 330, through which an ink droplet is ejected, is formed at a location in the oxide layer 312 and the second substrate 313 of the SOI wafer 310 corresponding to a central portion of the ink chamber 324. A groove 328 for an ink channel is formed at a location corresponding to a central line extending in a longitudinal direction of the ink channel 326.

An annular heater 340 centered around the nozzle 330 for forming a bubble is formed at a portion of the second substrate 313 of the SOI wafer 310. The heater 340 has inner and outer circumferences surrounded by an adiabatic barrier 342 formed in the shape of an annular groove with a width of about 1–2 μm, thereby insulating the heater 340 from other portions of the ink ejector. More particularly, the heater 340 is formed by limiting the portion of the second substrate 313 on top of the ink chamber 324 surrounded by the adiabatic barrier 342. The adiabatic barrier 342 not only insulates the heater 340 from other portions of the second substrate 313 but also prevents heat generated by the heater 340 from being conducted to other elements through the second substrate 313. The adiabatic barrier 342 may be filled with air but is preferably maintained in a vacuum state. Alternatively, predetermined insulating and adiabatic material fills the interior adiabatic barrier 342 to form the adiabatic barrier 342 formed of the predetermined insulating and adiabatic material.

A heater protective layer 350 is formed on the second substrate 313 on which the heater 340 has been formed. The heater protective layer 350 not only protects the heater 340 but also seals the adiabatic barrier 342. In this case, the interior space of the adiabatic barrier 342 is preferably maintained in a vacuum state as described above. An electrode 360 is connected to the heater 340 for applying pulse current.

Figure 26:
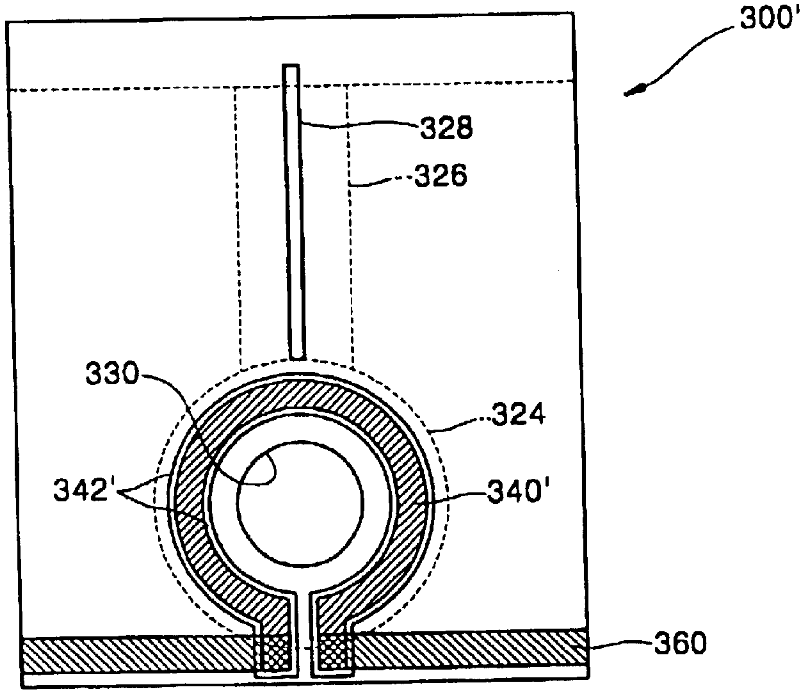
FIG. 26 is a top view of a modified example of the ink ejector of FIG. 24.

FIG. 26 is a top view showing a modified example of the ink ejector of FIG. 24. Referring to FIG. 26, a heater 340' of an ink ejector 300' is formed substantially in the shape of the Greek letter omega (Ω), and one of two electrodes 360 is connected to each end of the heater 340'. That is, the heater 340 shown in FIG. 24 is coupled in parallel between the electrodes 360, whereas the heater 340' shown in FIG. 26 is coupled in series therebetween. An adiabatic barrier 342' surrounding the heater 340' has an Ω-shape conforming to the shape of the heater 340'. The shapes and configurations of other components of the ink ejector 300' such as the ink chamber 324, the ink channel 326, the nozzle 330, and the groove 328 for an ink channel are the same as those of their counterparts in the ink ejector 300 shown in FIG. 24.

Figure 27:
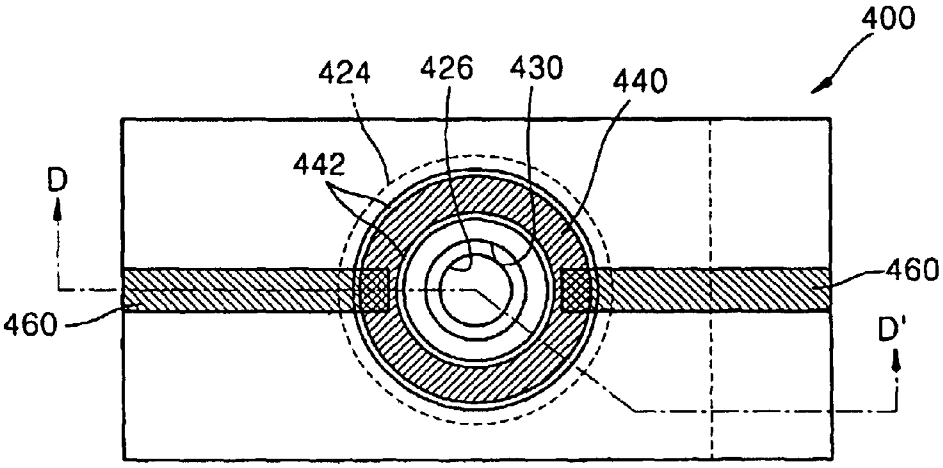
FIG. 27 is an enlarged top view of an ink ejector of an ink-jet printhead according to a fourth embodiment of the present invention.
Figure 28:
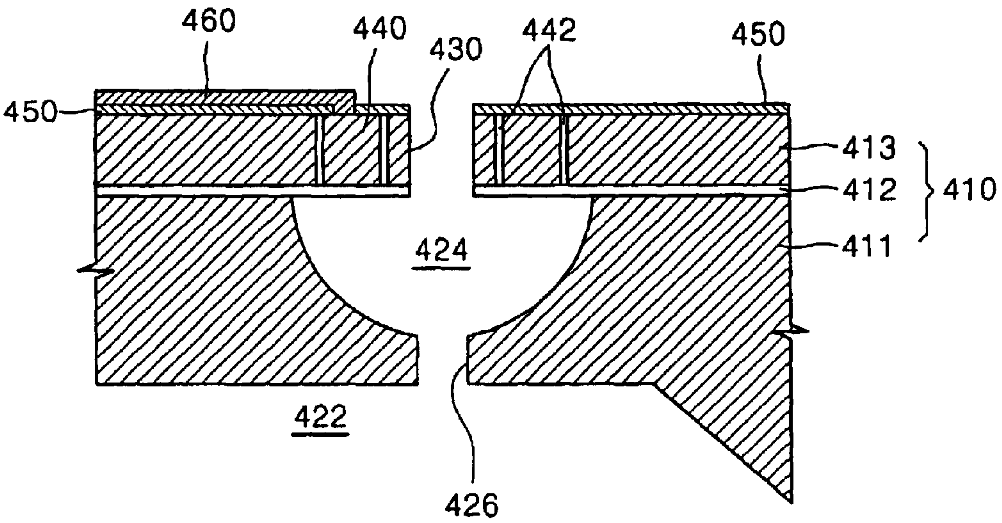
FIG. 28 is a cross-sectional view of a vertical structure of the ink ejector taken along line D–D' of FIG. 27.

FIG. 27 is a top view of an ink ejector of an ink-jet printhead according to a fourth embodiment of the present invention, and FIG. 28 is a cross-section of a vertical structure of the ink ejector taken along line D–D' of FIG. 27.

Referring to FIGS. 27 and 28, an ink ejector 400 according to this embodiment is configured in a way shown in FIG. 3 and formed on an SOI wafer 410. An ink chamber 424 having a substantially hemispherical shape in which ink is filled is formed on the top surface of a first substrate 411 of the SOI wafer 410. A manifold 422 for supplying ink to the ink chamber 424 is formed on the bottom surface of the first substrate 411 so that the manifold 422 is located below the ink chamber 424. An ink channel 426 linking the ink chamber 424 and the manifold 422 is formed at the center of the bottom of the ink chamber 424. In this case, since the diameter of the ink channel 426 affects a backflow of ink being pushed back into the ink channel 426 during ink ejection and the speed at which ink refills the ink chamber 424 after ink ejection, the diameter of the ink channel needs to be finely controlled during formation of the ink channel 426.

A nozzle 430 is formed in an oxide layer 412 and a second substrate 413 of the SOI wafer 410, and a heater 440 surrounded by an adiabatic barrier 442 is formed at a portion of the second substrate 413. A heater protective layer 450 is deposited over the second substrate 413 on which the heater 440 has been formed, and an electrode 460 is coupled to the heater 440.

Although the heater 440 has an annular shape in this embodiment, it may be formed in the shape of the Greek letter omega (Ω) as shown in FIG. 26.

The ink ejection mechanism of an ink-jet printhead having the ink ejector of FIG. 24 according to the present invention will now be described with reference to FIGS. 29A and 29B.

Figure 29A:
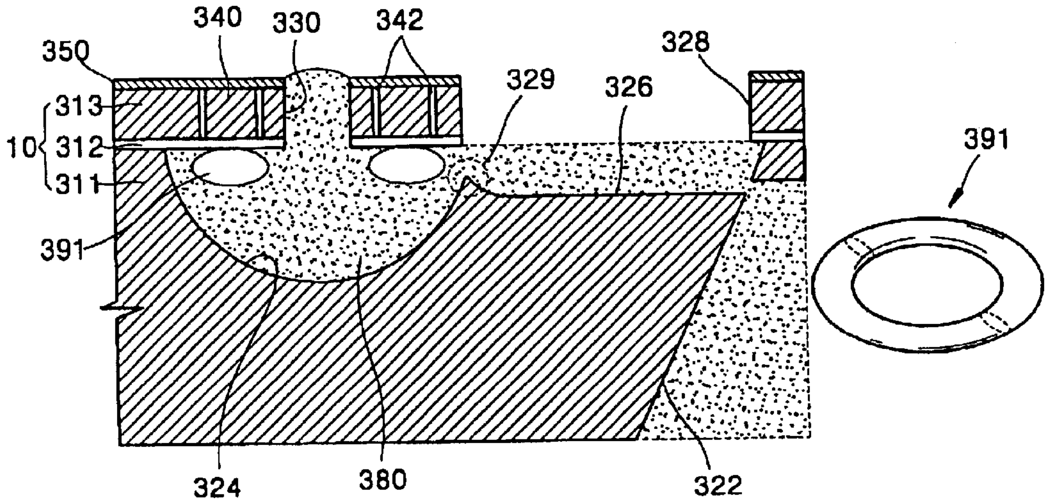
FIGS. 29A and 29B are cross-sectional views taken along lines C3–C3' of FIG. 24 illustrating the ink ejection mechanism of the ink ejector of FIG. 24.

Referring to FIG. 29A, ink 380 is supplied to the ink chamber 324 through the manifold 322 and the ink channel 326 by capillary action. If pulse current is applied across the heater 340 when the ink 380 fills the ink chamber 324, the heater 340 generates heat. The generated heat is prevented from being conducted to the sides of the heater 340 by the adiabatic barrier 342, thus transferring most of the heat to the ink 380 through the underlying oxide layer 312. This boils the ink 380 to form a bubble 391. The bubble 391 has a substantially doughnut shape conforming to the shape of the heater 340 as shown to the right side of FIG. 29A.

Figure 29B:
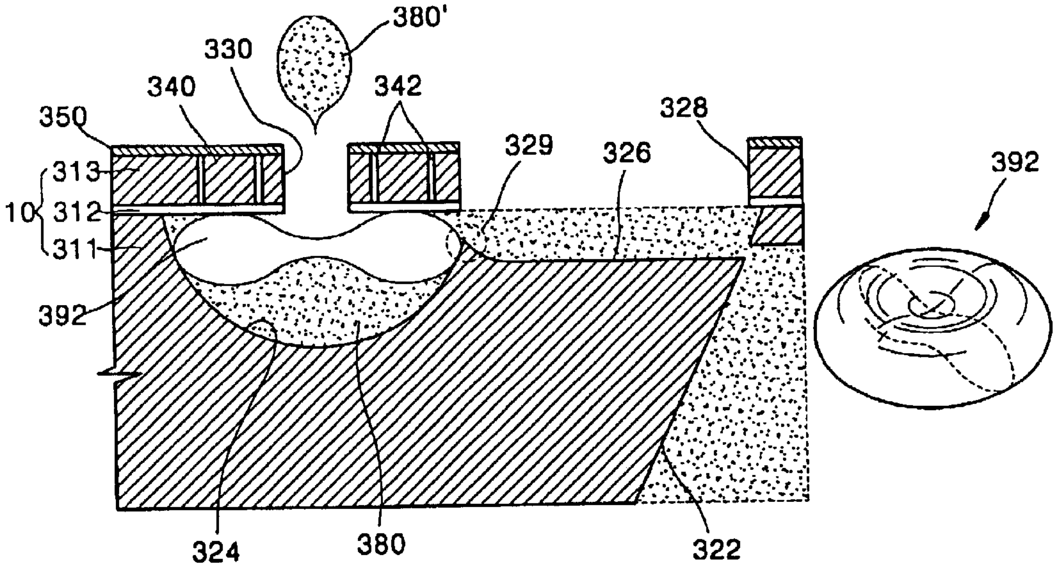

If the doughnut-shaped bubble 391 expands with the lapse of time, as shown in FIG. 29B, the bubble 391 coalesces below the nozzle 330 to form a substantially disk-shaped bubble 392, the central portion of which is concave. At the same time, the expanding bubble 392 causes an ink droplet 380' to be ejected from the ink chamber 324 through the nozzle 330. If the applied current cuts off, the heater 340 is cooled to shrink or collapse the bubble 392, and then the ink 380 refills the ink chamber 324.

In the ink ejection mechanism of the printhead according to this embodiment, the doughnut-shaped bubble 391 coalesces under the central portion of the nozzle 330 to form the disk-shaped bubble 392. This cuts off the tail of the ejected ink droplet 380', thus preventing the formation of the satellite droplets. Furthermore, since the ink chamber 324 has a hemispherical shape, a path along which the bubbles 391 and 392 expand is more stable than in a conventional ink chamber having the shape of a rectangular solid or a pyramid, and the formation and expansion of a bubble occur quickly thus ejecting ink within a relatively short time. Furthermore, the area of the heater 340 having an annular or Ω-shape is wide, thereby enabling it to be rapidly heated and cooled, which shortens a cycle beginning with the formation of the bubble 391 or 392 and ending with the collapse thereof, thereby allowing for a quick response rate and high operating frequency.

Furthermore, the expansion of the bubble 391 or 392 is limited to within the ink chamber 324, thereby preventing a backflow of the ink 380 and thus cross-talk between adjacent ink ejectors. Furthermore, since the ink channel 326 is shallower than the ink chamber 324 and the stopper 329 is formed at a junction of the ink chamber 324 and the ink channel 326, it is effective in preventing the ink 380 and the bubble 392 from being pushed back into the ink channel 326.

In particular, heat generated by the heater 340 is prevented from being conducted to portions other than the ink 380 by the adiabatic barrier 342, thereby transmitting a greater amount of heat energy generated by the heater 340 to the ink 380. This increases effective use of energy to decrease a time taken from the formation of the bubbles 391 and 392 until the collapse thereof, thereby providing a high operating frequency.

Furthermore, the upper wall of the ink chamber 324 formed by the oxide layer 312 and the second substrate 313 of the SOI wafer 310 is sufficiently thick to prevent transformation of the ink chamber 324 and the upper wall thereof due to heat generated by the heater 340 and a pressure change resulting from expansion and collapse of the bubbles 391 and 392 within the ink chamber 324. Accordingly, consistent formation and reproducibility of the bubbles 391 and 392, in terms of shape and size, in the ink chamber 324, the ejection of uniform ink droplets 380', and greater durability of the ink ejector 300 are ensured.

In addition, the nozzle 330 formed in the oxide layer 312 and the second substrate 313 of the SOI wafer 310 is sufficiently long to accurately guide a direction in which the ink droplet 380' is ejected without a separate guide.

A method of manufacturing an ink-jet printhead according to the present invention using an SOI wafer will now be described. FIGS. 30–36 are cross-sectional views showing a method of manufacturing a printhead having the ink ejector illustrated in FIG. 24 according to a third embodiment of the present invention. The left and right sides of FIGS. 30–36 are cross-sectional views of the ink-jet printhead taken along lines C1–C1' and C3–C3' of FIG. 24, respectively.

Figure 30:
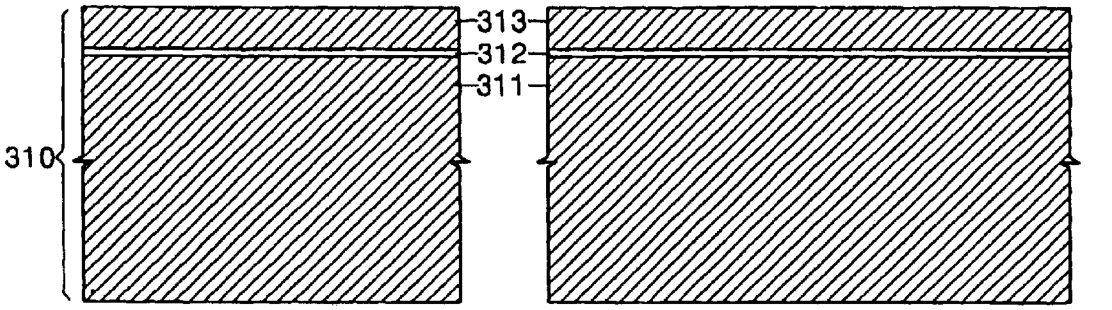
FIGS. 30–36 are cross-sectional views showing a process of manufacturing an ink-jet printhead having the ink ejector with the structure shown in FIG. 24 according to a third embodiment of the present invention.

Referring to FIG. 30, an SOI wafer 310 is prepared. As described above, the SOI wafer 310 has a structure in which a first substrate 311, an oxide layer 312, and a second substrate 313 are stacked. The SOI wafer 310 having the above-described structure is readily available from wafer manufacturers. In this case, the second substrate 313 of the SOI wafer 310 is approximately 10–30 μm thick, and preferably is about 20 μm thick.

Figure 31:
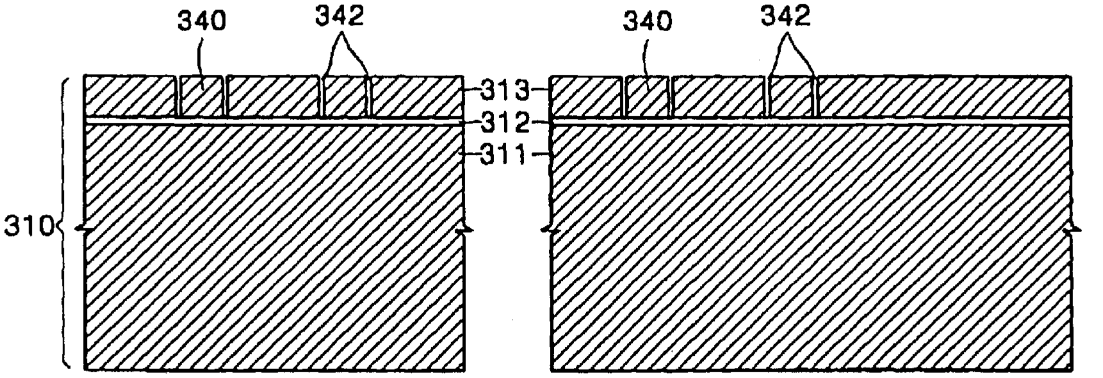

As shown in FIG. 31, the second substrate 313 of the SOI wafer 310 is etched to form an adiabatic barrier 342 having a width of about 1–2 μm in the shape of an annular groove. The adiabatic barrier 342 surrounds the inner and outer circumferences of a heater 340 so that the annular heater 340 limited by the adiabatic barrier 342 is insulated from other portions of the second substrate 313.

Figure 32:
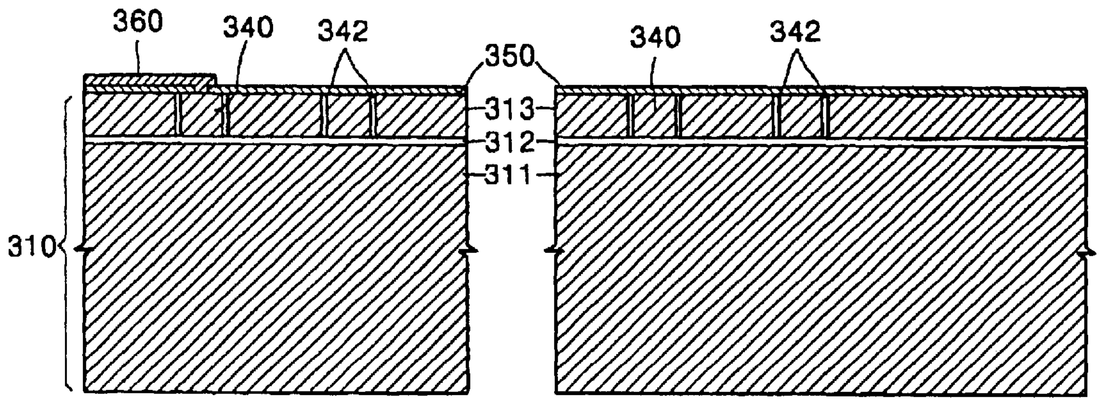

FIG. 32 illustrates a state in which a heater protective layer 350 and an electrode 360 have been formed on the second substrate 313 having the heater 340 and the adiabatic barrier 342. The heater protective layer 350 is formed by depositing a TEOS oxide layer on the second substrate 313 to a thickness of about 0.5–1 μm by means of CVD. Although the TEOS oxide layer is used as the heater protective layer 350 in this embodiment, an oxide layer formed of another material or a nitride layer may be used instead. The heater protective layer 350 is preferably deposited using low temperature CVD since the interior space of the adiabatic barrier 342 may be maintained in a vacuum state. Before forming the heater protective layer 350, the adiabatic barrier 342 may be filled with predetermined insulating and adiabatic material to form the adiabatic barrier 342 made of the predetermined insulating and adiabatic material.

Subsequently, a portion of the heater protective layer 350 at which the top of the heater 130 is to be connected to the electrode 360 is etched to expose the heater 340. The electrode 360 is formed by depositing metal having good conductivity and patterning capability such as aluminum or aluminum alloy to a thickness of about 1 μm using a sputtering technique and patterning the same. In this case, the metal layer of the electrode 360 is simultaneously patterned to form wiring lines and the bonding pad at other portions of the second substrate 313.

Figure 33:
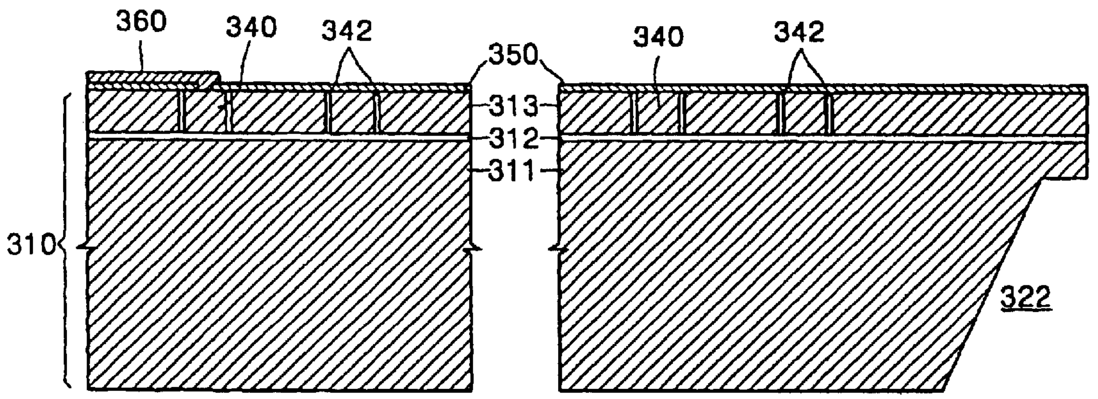

FIG. 33 illustrates a state in which the first substrate 311 has been etched from its bottom surface to form a manifold 322. The manifold 322 is formed by obliquely etching the bottom surface of the first substrate 311. More specifically, an etch mask that limits a region to be etched is formed on the bottom surface of the first substrate 311, and wet etching is performed for a predetermined time using tetramethyl ammonium hydroxide (TMAH) as an etchant. Accordingly, since etching in a crystal orientation of [111] is slower than etching in other orientations, the manifold 322 is formed with a side surface inclined at 54.7 degrees. The manifold 322 may be formed prior to forming the electrode 360. Although it has been described that the manifold 322 is formed by obliquely etching the bottom surface of the first substrate 311, the manifold 112 may be formed by anisotropic etching.

Figure 34:
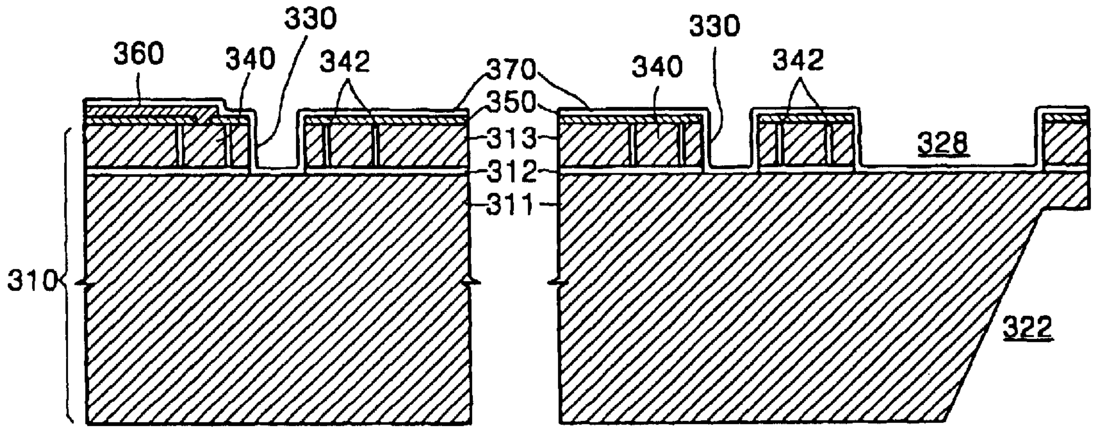

FIG. 34 illustrates a state in which the TEOS oxide layer 370 has been deposited after forming a nozzle 330 and a groove 328 for an ink channel. The nozzle 330 is formed by anisotropically etching the heater protective layer 350, the second substrate 313, and the oxide layer 312 in sequence until the first substrate 311 is exposed on the inside of the heater 340 with a diameter less than that of the heater 340, for example, 16–20 μm. The groove 328 for an ink channel is formed by sequentially etching the heater protective layer 350, and the second substrate 313 and the oxide layer 312 of the SOI wafer 310 in a straight line from the outside of the heater 340 to the area above the manifold 322. The groove 328 for an ink channel has a length of about 50 μm and a width of about 2 μm. Also, the groove 328 for an ink channel may be formed in the step shown in FIG. 35.

The TEOS oxide layer 370 is then formed. The TEOS oxide layer 370 may be deposited by means of CVD to a thickness of about 1 μm at low temperature at which the electrode 360 and the bonding pad made from aluminum or aluminum alloy are not transformed, for example, at no greater than 400° C.

Figure 35:
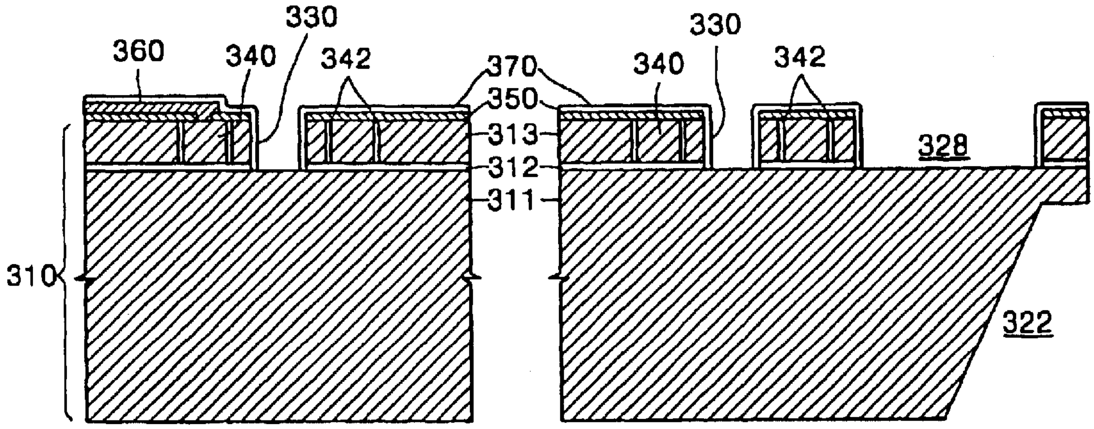

Then, as shown in FIG. 35, the TEOS oxide layer 370 on the bottom surfaces of the nozzle 322 and groove 328 for an ink channel is etched to expose the first substrate 311.

Figure 36:
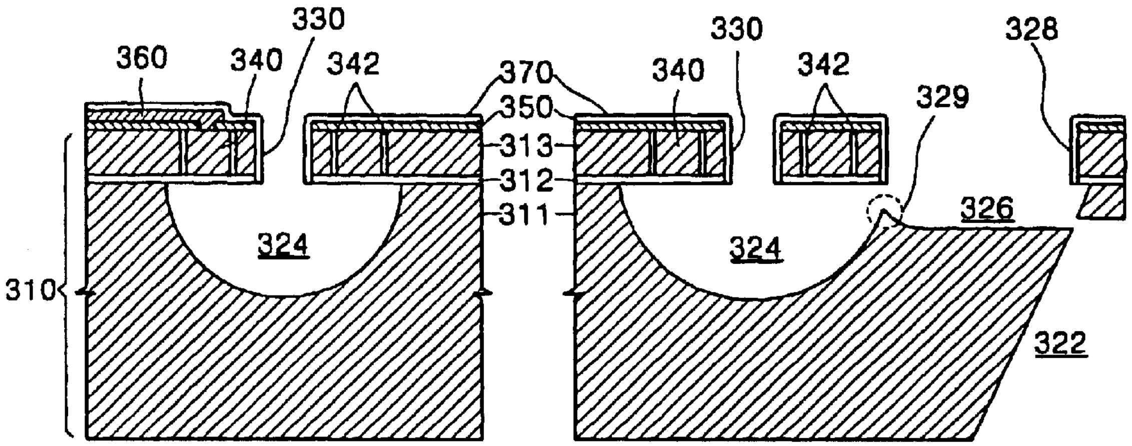

FIG. 36 shows a state in which the exposed first substrate 311 has been etched to form the ink chamber 324 and the ink channel 326. The ink chamber 324 may be formed by isotropically etching the first substrate 311 exposed through the nozzle 330. Specifically, the first substrate 311 is dry etched for a predetermined period of time using $XeF_2$ gas or $BrF_3$ gas as an etch gas. Then, as shown in FIG. 36, the substantially hemispherical ink chamber 324 is formed with a depth and a radius of about 20 μm, and the ink channel 326 for linking the ink chamber 324 and the manifold 322 is formed with a depth and a radius of about 8–12 μm. Also, a projecting stopper 329 is formed by etching at the junction of the ink chamber 324 and the ink channel 326. The ink chamber 324 and the ink channel 326 may be simultaneously or sequentially formed. The ink chamber 324 may be formed by anisotropically etching the top surface of the first substrate 311 to a predetermined depth and then isotropically etching the same. In this way, the ink-jet printhead according to the third embodiment of the present invention is completed.

Figure 37:
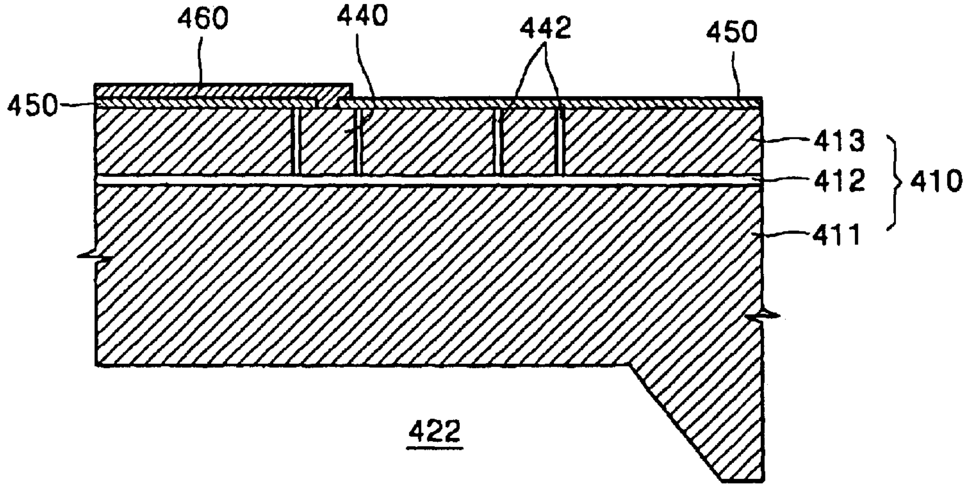
FIGS. 37 and 38 are cross-sectional views showing a process of manufacturing an ink-jet printhead having the ink ejector with the structure shown in FIG. 27 according to a fourth embodiment of the present invention.
Figure 38:
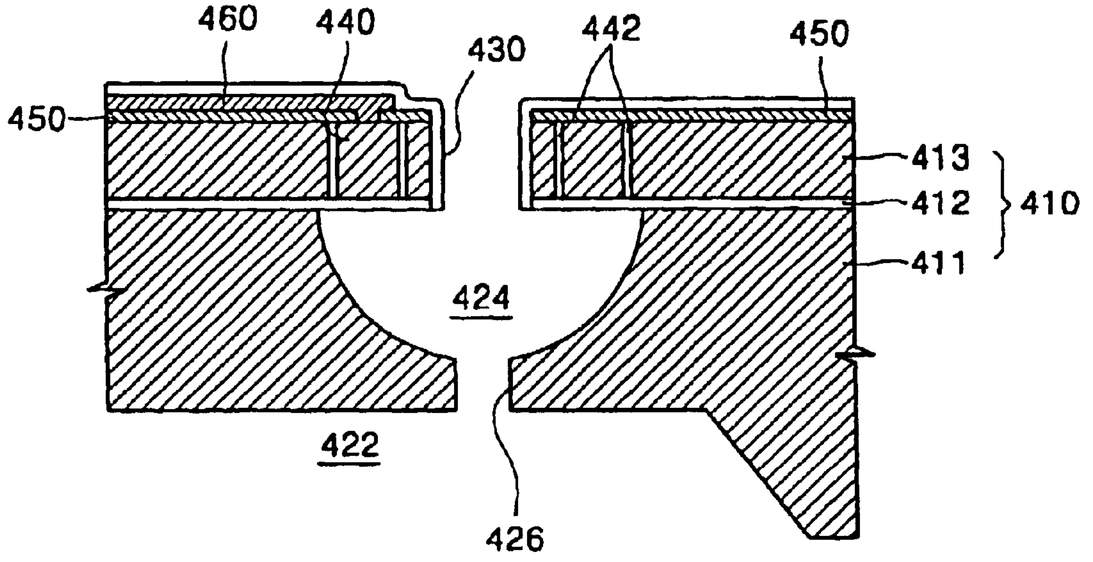

FIGS. 37 and 38 are cross-sections taken along line D–D' of FIG. 27 showing a method of manufacturing an ink-jet printhead having the ink ejector with the structure as shown in FIG. 27 according to a fourth embodiment of the present invention.

A method of manufacturing the ink-jet printhead according to this fourth embodiment is the same as the manufacturing method according to the third embodiment shown in FIGS. 30–36 except for the step of forming the manifold. This fourth embodiment is the same as the third embodiment up to the fabricating steps shown in FIGS. 30–32 but is different in the position where the manifold is formed in the step shown in FIG. 33. In particular, a manifold 422 in this fourth embodiment is formed by etching the bottom surface of a first substrate 411 so that the manifold 422 is positioned at the bottom of an ink chamber to be subsequently formed.

This fourth embodiment is also the same as the third embodiment in the steps shown in FIGS. 34–36 except for the formation of an ink channel. In this fourth embodiment, as shown in FIG. 38, the middle portion of the bottom of an ink chamber 424 is anisotropically etched to form an ink channel 426 in flow communication with the manifold 422, thereby completing the ink-jet printhead according to the fourth embodiment of the present invention shown in FIG. 27.

As described above, a bubble-jet type ink-jet printhead according to the present invention and manufacturing method thereof according to the present invention have several advantages. First, an adiabatic layer or an adiabatic barrier surrounded by a heater prevents heat generated by the heater from being conducted to an area above the heater or to portions other than ink, so that most of the heat flows into the ink below the heater, thereby providing for a high operating frequency and stable operation for a long time while increasing energy efficiency. Second, the bubble is doughnut-shaped and the ink chamber is hemispherical, thereby preventing a backflow of ink and thus cross-talk between adjacent ink ejectors while preventing the formation of satellite droplets. Third, the upper wall of an ink chamber formed by an oxide layer and a second substrate of an SOI wafer is sufficiently thick and robust to prevent transformation of the ink chamber and the upper wall thereof due to heat generated by a heater and a pressure change within the ink chamber. Thus, this constantly maintains the shape of the bubbles 391 and 392 formed in the ink chamber 324, makes the ejection of an ink droplet uniform, and increases the durability of the entire ink ejector. Fourth, according to a conventional printhead manufacturing method, a nozzle plate, an ink chamber, and an ink channel are manufactured separately and bonded to each other. However, a method of manufacturing a printhead according to the present invention provides forming the nozzle plate and the annular heater integrally with the substrate having the manifold, the ink chamber and the ink channel thereon, thereby simplifying the fabricating process and preventing occurrences of mis-alignment. Thus, the manufacturing method according to the present invention is compatible with a typical manufacturing process for a semiconductor device, thereby facilitating high volume production. In particular, the steps of forming an oxide layer on the substrate as a nozzle plate and of depositing a heater of a predetermined material may be omitted when using the SOI wafer, thereby simplifying the fabrication process.

Although this invention has been described with reference to preferred embodiments thereof, it will be understood by those of ordinary skill in the art that various changes in form and details may be made therein. For example, materials forming elements of a printhead according to the present invention may not be limited to those described herein. That is, the substrate 100 may be formed of a material having good processibility, other than silicon, and the same is true for a heater, an electrode, a silicon oxide layer, or a nitride layer. Furthermore, the stacking and formation method for each material are only examples, and a variety of deposition and etching techniques may be adopted.

Also, the sequence of process steps in a method of manufacturing a printhead according to this invention may differ. For example, specific numeric values illustrated in each step may vary within a range in which the manufactured printhead may operate normally.

The shape of the ink chamber, the ink channel, and the heater in the printhead according to this invention provides a high response rate and high operating frequency. Furthermore, doughnut-shaped bubbles coalesce at the center, which prevents the formation of satellite droplets.

The present invention makes it easier to control a backflow of ink and operating frequency by controlling the diameter of the ink channel. Furthermore, the ink chamber, the ink channel, and the manifold are arranged vertically to reduce the area occupied by the manifold on a plane, thereby increasing the integration density of a printhead.

What is claimed is:

1. A method of manufacturing a bubble-jet type ink-jet printhead using a silicon-on-insulator (SOI) wafer, the method comprising:

preparing the SOI wafer having a first substrate, an oxide layer stacked on the first substrate, and a second substrate stacked on the oxide layer;

etching the second substrate and forming an adiabatic barrier having a groove defining a heater;

forming a heater protective layer on the second substrate for protecting the heater and sealing the adiabatic barrier;

forming an electrode electrically connected to the heater on the heater protective layer;

etching a bottom side of the first substrate and forming a manifold for supplying ink;

sequentially etching the heater protective layer, the second substrate, and the oxide layer on the inside of the heater with a diameter less than that of the heater and forming a nozzle;

etching the first substrate exposed by the nozzle and forming an ink chamber having a substantially hemispherical shape; and etching the first substrate and forming an ink channel for supplying ink from the manifold to the ink chamber, wherein the adiabatic barrier is formed along inner and outer circumferences to surround the heater, thereby insulating the heater from another portion of the second substrate and wherein forming the heater protective layer is performed by means of low-pressure chemical vapor deposition so that the adiabatic barrier is maintained substantially in a vacuum state.

2. The method as claimed in claim 1, wherein the adiabatic barrier has the shape of an annular groove to define an annular heater.

3. The method as claimed in claim 1, wherein the heater is formed in the shape of the Greek letter omega (Ω).

4. The method as claimed in claim 1, wherein the thickness of the second substrate of the SOT wafer is between about 10–30 $\mu$m.

5. The method as claimed in claim 1, wherein forming the ink channel comprises:

sequentially etching the heater protective layer, the second substrate, and the oxide layer from the outside of the heater toward the manifold and forming a groove for an ink channel that exposes the first substrate; and isotropically etching the first substrate exposed by the groove for an ink channel.

6. The method as claimed in claim 5, further comprising forming a stopper at a junction of the ink chamber and the ink channel for preventing a bubble from being pushed back into the ink channel when the bubble expands.

7. The method as claimed in claim 1, wherein in forming the ink channel, the first substrate at the bottom of the ink chamber is anisotropically etched with a predetermined diameter to form the ink channel in flow communication with the manifold.

8. A method of manufacturing a bubble-jet type ink-jet printhead using a silicon-on-insulator (SOD wafer, the method comprising:

preparing the SOI wafer having a first substrate, an oxide layer stacked on the first substrate, and a second substrate stacked on the oxide layer;

etching the second substrate and forming an adiabatic barrier having a groove defining a heater, wherein the adiabatic barrier is formed along inner and outer circumferences to surround the heater, thereby insulating the heater from another portion of the second substrate;

filling the adiabatic barrier with predetermined insulating and adiabatic material prior to forming a heater protective layer;

forming the heater protective layer on the second substrate for protecting the heater arid sealing the adiabatic barrier;

forming an electrode electrically connected to the heater on the heater protective layer;

etching a bottom side of the first substrate and forming a manifold for supplying ink;

sequentially etching the heater protective layer, the second substrate, and the oxide layer on the inside of the heater with a diameter less than that of the heater and forming a nozzle;

etching the first substrate exposed by the nozzle and forming an ink chamber having a substantially hemispherical shape; and etching the first substrate and forming an ink channel for supplying ink from the manifold to the ink chamber.

9. The method as claimed in claim 8, wherein the adiabatic barrier has the shape of an annular groove to define an annular heater.

10. The method as claimed in claim 8, wherein the heater is formed in the shape of the Greek letter omega (Ω).

11. The method as claimed in claim 8, wherein the thickness of the second substrate of the SOI wafer is between about 10–30 $\mu$m.

12. The method as claimed in claim 8, wherein forming the ink channel comprises:

sequentially etching the heater protective layer, the second substrate, and the oxide layer from the outside of the heater toward the manifold and forming a groove for an ink channel that exposes the first substrate; and isotropically etching the first substrate exposed by the groove for an ink channel.

13. The method as claimed in claim 12, further comprising forming a stopper at a junction of the ink chamber and the ink channel for preventing a bubble from being pushed back into the ink channel when the bubble expands.

14. The method as claimed in claim 8, wherein in forming the ink channel, the first substrate at the bottom of the ink chamber is anisotropically etched with a predetermined diameter to form the ink channel in flow communication with the manifold.

* * * * *